Sept. 13, 1955 F. P. GOHOREL 2,717,924

TELEPHONE SYSTEMS

Filed Oct. 10, 1951 8 Sheets-Sheet 1

Inventor
F. P. GOHOREL

By Robert Harding Jr.
Attorney

Sept. 13, 1955 F. P. GOHOREL 2,717,924

TELEPHONE SYSTEMS

Filed Oct. 10, 1951 8 Sheets-Sheet 2

Inventor
F. P. GOHOREL
By Robert Harding Jr.
Attorney

Sept. 13, 1955

F. P. GOHOREL 2,717,924

TELEPHONE SYSTEMS

Filed Oct. 10, 1951

8 Sheets-Sheet 3

Inventor
F. P. GOHOREL

By Robert Harding Jr.
Attorney

Sept. 13, 1955 F. P. GOHOREL 2,717,924

TELEPHONE SYSTEMS

Filed Oct. 10, 1951 8 Sheets-Sheet 4

*Inventor*
F. P. GOHOREL

*By* Robert Harding Jr.
*Attorney*

Inventor
F. P. GOHOREL
By Robert Harding Jr.
Attorney

Sept. 13, 1955 F. P. GOHOREL 2,717,924

TELEPHONE SYSTEMS

Filed Oct. 10, 1951 8 Sheets-Sheet 6

Inventor
F. P. GOHOREL

By
Attorney

Sept. 13, 1955 F. P. GOHOREL 2,717,924

TELEPHONE SYSTEMS

Filed Oct. 10, 1951 8 Sheets-Sheet 7

Inventor
F. P. GOHOREL

By Robert Harding Jr.
Attorney

Inventor
F. P. GOHOREL

By Robert Harding Jr.
Attorney

United States Patent Office 2,717,924

Patented Sept. 13, 1955

2,717,924

TELEPHONE SYSTEMS

Fernand Pierre Gohorel, Antony, France, assignor to International Standard Electric Corporation, New York, N. Y., a corporation of Delaware Application October 10, 1951, Serial No. 250,659

Claims priority, application France October 13, 1950

4 Claims. (Cl. 179—18)

Figure 1:
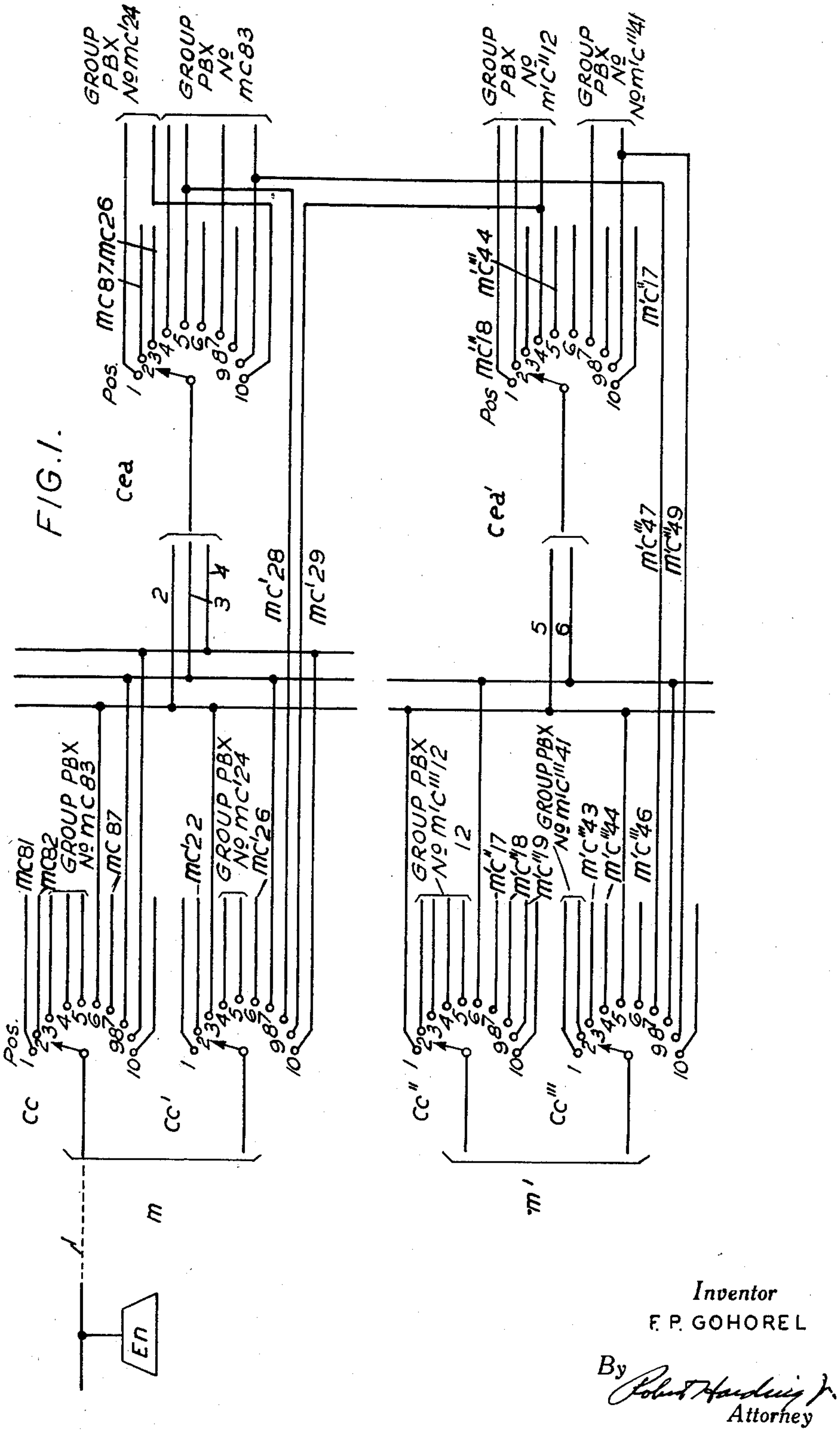

The present invention relates to telephone systems and, more particularly, to those comprising grouped subscriber lines, that is, lines that can be rung by means of the same call number (P. B. X lines). When such a call number is dialed, the connector or final selector successively tests all the lines of the group of the called subscriber and causes the calling subscriber to be connected to the first free line. Said calling subscriber receives the busy signal only when all the lines of the group are busy. It may happen that a subscriber already having a certain number of grouped lines desires to increase this number; in particular a subscriber having only one line may want to have two or more grouped lines. If there are still positions available on the banks of the corresponding connectors, his application can be taken care of by connecting one or more other lines to said banks, but more often the lines of the group thus constituted do not follow one another, and that makes it necessary to have certain special positions in order to be able to obtain the testing of the P. B. X group by the dialing of a single call number.

One of the features of the invention resides in connecting, on the banks of final selectors or normal connectors, (1) subscriber lines and (2) lines terminating at a supplementary selector, or cooperating connector, said cooperating connectors having access to grouped (P. B. X) subscriber lines that cannot be accommodated on the banks of normal connectors.

Another feature of the invention resides in transferring grouped subscriber lines from the banks of normal connectors to the banks of cooperating connectors and in replacing said grouped subscriber lines with lines terminating each at a cooperating connector, such positions as may remain available in said cooperating connectors being reserved for subscribers likely to ask for additional lines under the same call number.

Another feature of the invention resides in the fact that, when a call number belonging to grouped lines assigned to a given subscriber is sent to a normal connector, said connector successively tests the lines of said group that are connected to the banks and that, when all said lines are busy, the connector proceeds to hunt for a free line terminating at a cooperating connector, a signal then being sent to the register to cause the latter to control the routing of the cooperating connector.

A further feature of the invention resides in the fact that, when it has not been possible to accommodate on the banks of connectors all the grouped lines assigned to a subscriber, the last of the lines connected to the banks of said connectors is given a characteristic that, in the event said line is busy, causes (1) the routing of said normal connector to a line terminating at a cooperating connector and (2) the sending to the register of a signal that causes the control of the routing of the cooperating connector.

A further feature of the invention resides in giving each free connecting line between a normal connector and a cooperating connetcor two different characteristics, the first indicating that said line is connected to a cooperating connector and the second indicating that the line is free, arrangementts being further provided so that a normal connetcor placed in position of hunting for a cooperating line can stop only on a line to which said characteristics are applied simultaneously.

In order to allow free hunting in a group, the first and the last lines of said group may be given two different characteristics, the first of said characteristics causing, if need be, the re-starting of the normal connector and the second controlling the stopping on the final line of the group.

A further feature of the invention resides in using a plurality of different characteristics, the first for the first line of a subscriber group, the second for the final line of a group not having other lines on the banks of cooperating connectors, the third for the final line of a group having other lines on the banks of cooperating connectors and the fourth for a line terminating at a cooperating connector, the same circuit being used to transmit these various characteristics to the connector and to the associated director.

A further feature of the invention resides in using staggered potentials in order to make up the various line characteristics.

In general, the lines connected to the banks of a normal connetcor follow one another in a numerical order, each line following the one having the next lower number; the routing is effected in two steps, the connector stopping first on the first line of the called subscriber's tens group and thereupon proceeding to hunt, among the lines of said tens group, for a line corresponding to the units digit of said subscriber.

A further feature of the invention resides in connecting the lines of the same group of subscriber lines to any desired position of the cooperating connector, the routing of said connector being placed (1) under the control of devices that have registered a portion of the corresponding call number and (2) under the control of the characteristic applied to the free subscriber lines.

The normal connectors of the same group, that is to say, those giving access to the same subscriber lines, usually serve only a rather limited number of subscribers (one hundred, for example); the number of grouped lines that it has not been possible to accommodate on the banks of said connectors may be small, and the cooperating connectors reached across these connectors run the risk of being poorly utilized.

A further feature of the invention resides in the fact that the cooperating connectors giving access to the same grouped lines are accessible to a plurality of groups of normal connectors serving different subscribers, arrangements being provided to control the routing of the cooperating connector by means of the digit or digits characterising the group of normal connectors in which it has not been possible to accommodate the called line (hundreds digit, for example) and by means of the digit or digits already used for routing the normal connector (tens and units digits).

A cooperating connector can serve a certain group of subscribers, such as one thousand, but the associated director can also control other cooperating connectors giving access to other groups. In that case, said director must register the digit or digits chacterizing that group (thousands digit, for example).

A further feature of the invention resides in applying to the directors of cooperating connectors the routing principle explained in French Patent No. 908,693, issued October 15, 1945, for "Improvements in Telephone Systems," and referring particularly to a routing device, common to a plurality of cooperating connectors, that comprises as many seizure circuits as there are groups of subscribers to be served, the use of a given seizure circuit causing not only the seizure of the director but also the operation of a device that registers the identity of the group dialed.

When several lines form part of the same group of subscriber lines it may be of interest to reach a given one among the lines of this group by means of a specific call number. Such is the case, for example, of a line that is connected at night to a special station.

A further feature of the invention resides in the fact that a line forming part of a group of subscriber lines and connected to the banks of a cooperating connector can likewise appear on the banks of a normal connector, it being possible to reach said line either by means of a call number common to the lines of said group or by means of a special call number.

When the selection operations have ended in a normal connector, said connector can be stopped (1) on a free subscriber line, (2) on a busy subscriber line or (3) on a line terminating at a cooperating connector.

A further feature of the invention resides in the fact that, when the selection operations have ended in a normal connector, the register is sent a signal that differs according to whether the connector is directed toward a free subscriber line, a busy subscriber line, or a cooperating line; in the first case, said register proceeds, if necessary, to perform the metering operations, completes the connection and releases; in the second case, it controls the sending of the busy signal to the calling subscriber and causes (if need be) the release of the chain of seized members; in the third case, it controls the routing of the cooperating connector by means of the whole or part of the call number dialed.

A further feature of the invention resides in the fact that, when a call originates with an operator, the operation of the final selection stage is so modified that, if the called subscriber is busy without an operator listening in on the call in progress, said stage sends the register the same signal as if the subscriber were free, said register then completing the connection in order to make it possible to listen in and wait on the busy subscriber.

A further feature of the invention resides in the fact that, when the selection operations have ended in the cooperating connector, the register is sent a signal that differs according to whether said connector has or has not found a free subscriber line, the signal characterizing the availability of the line and that characterizing the busy condition being identical with the signals transmitted in the case where the subscriber is reached directly by the normal connector.

In certain systems the routing of each selection stage is obtained by transmitting a coded signal continuously from the register (continuous marking system).

A further feature of the invention resides in the fact that, when the continuous marking signal has been registered at any given selection stage, said stage sends the register two signals in return, the first of said signals putting an end to the transmission of the marking signal and the second of said signals indicating to the register whether or not it is necessary to repeat the same digit to the next selection stage; when said stage is passed in dialing position, it sends the register a signal that causes the latter to send out the marking signal that must cause the routing of said stage.

A further feature of the invention resides in using the same signals and the same transmission circuit to indicate (1) that the register must or must not repeat any given digit and (2) that the called subscriber is free or busy, the register then using said signals differently according to whether it is in a position to route any selector whatever or in a position to route a final selector.

It is common practice to use connectors having several series of wipers, each of said series giving access to different lines.

A further feature of the invention resides in the fact that, when the normal-connector director proceeds to select the called subscriber, the various circuits performing similar functions but connected to the various series of wipers are connected to the same wire, this allowing the same free- and busy-test device and the same line-discrimination to be used for all the series of wipers, but that, when said director proceeds to select a free cooperating line, said circuits are isolated in order to connect them to cooperating-line test devices individual to each series of wipers; in the case of the selection of a subscriber, the connection of a given series of wipers, in the normal connector, is placed under the control of the call number received at the director, while in the case of the selection of a cooperating line it is placed under the control of the test device that operated when said selection ended.

The sending of the ringing current to the called subscriber is generally effected in the form of recurrent pulses; in other words, the periods of transmission are broken by periods of interruption. The ringing-current generator may be in a period of interruption at the particular moment the connector reaches a free line, the called subscriber being then rung only after a certain delay.

A still further feature of the invention resides in that a device continuously producing ringing current is used in the director of the final selection stage, said device being connected to the called subscriber's line as soon as said line has been tested free, said director thereupon releasing after having completed the connection and the sending of the ringing current continuing as usual.

Figure 2:
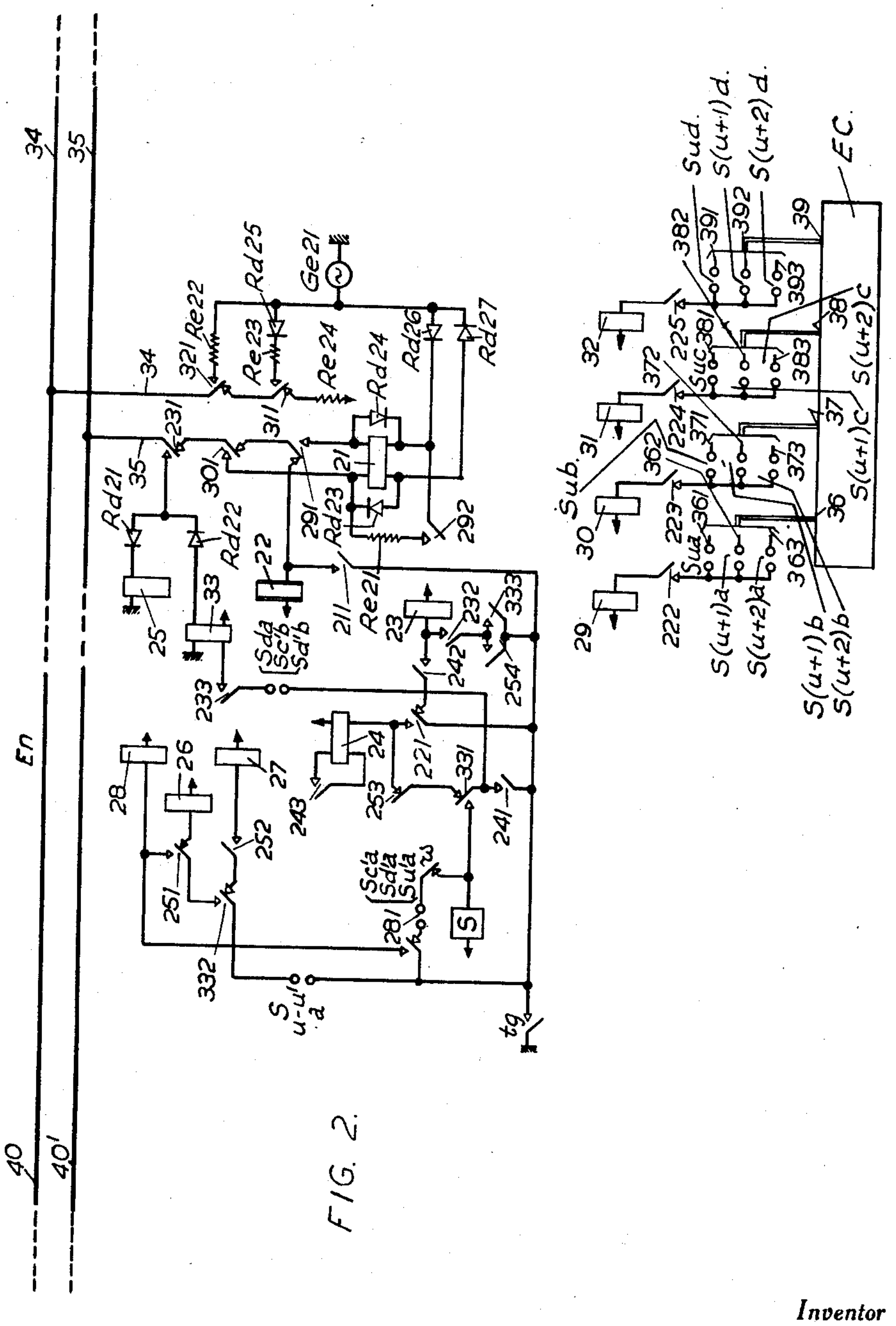
Figure 3:
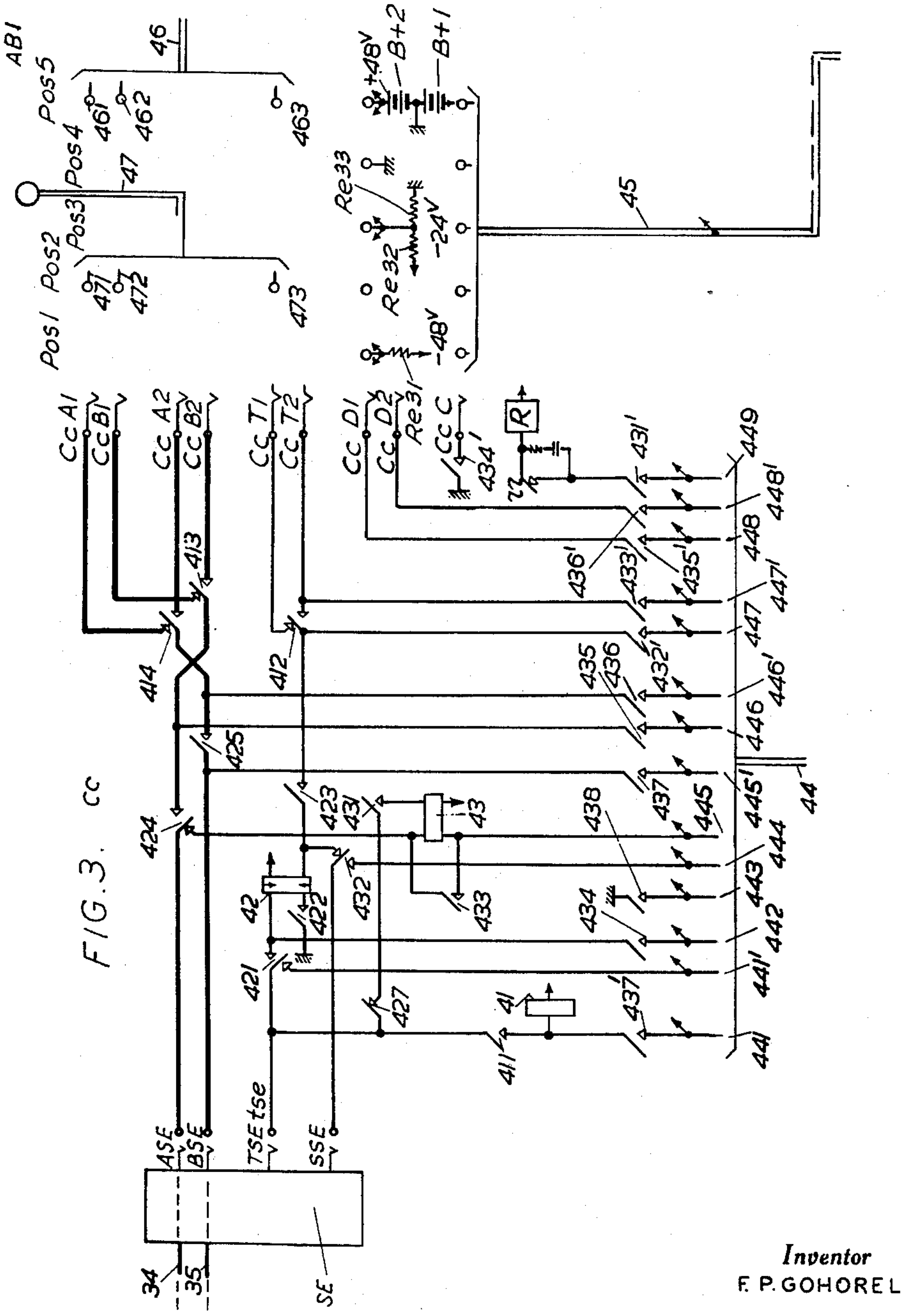
Figure 4:
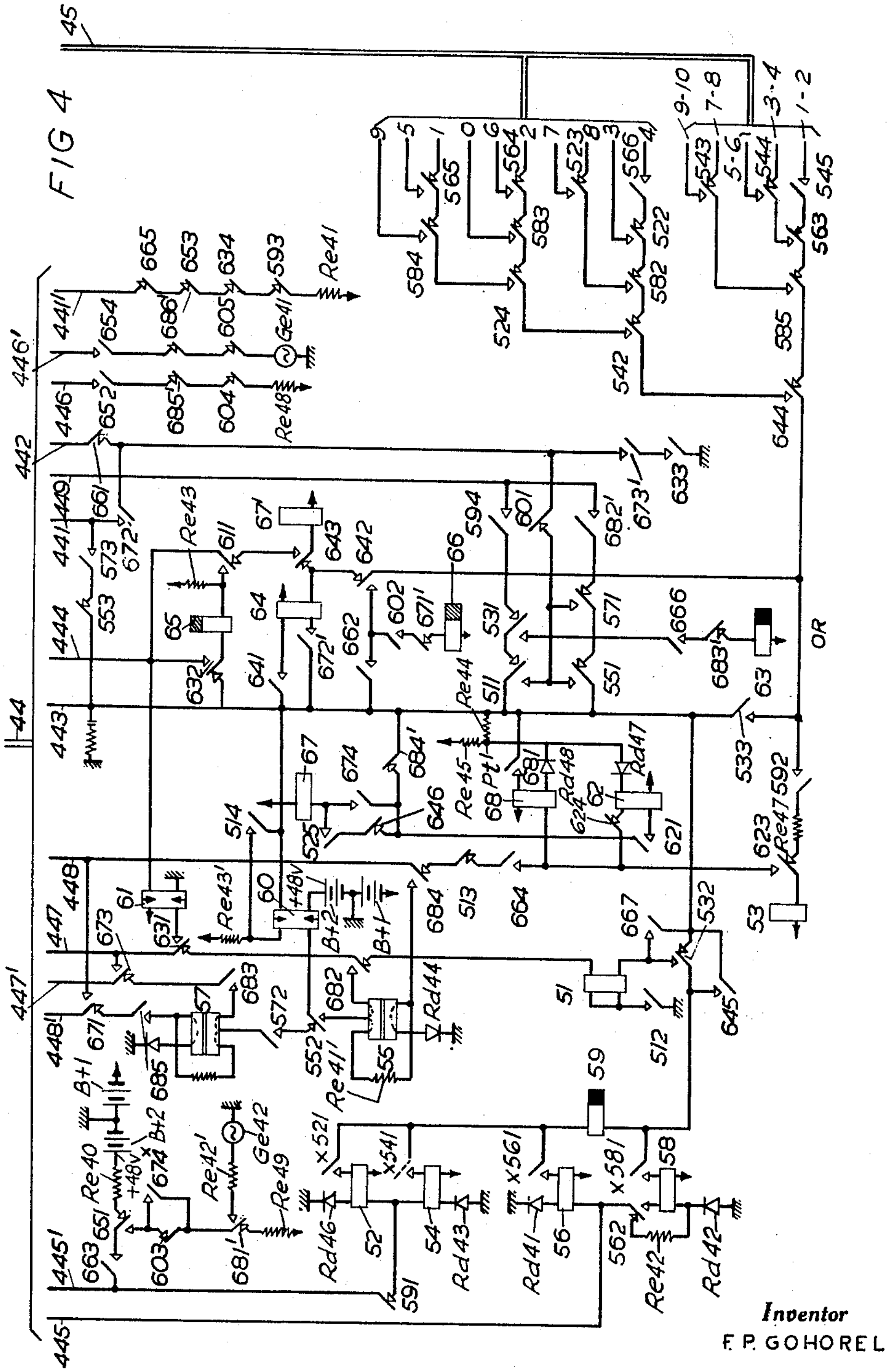
Figure 5:
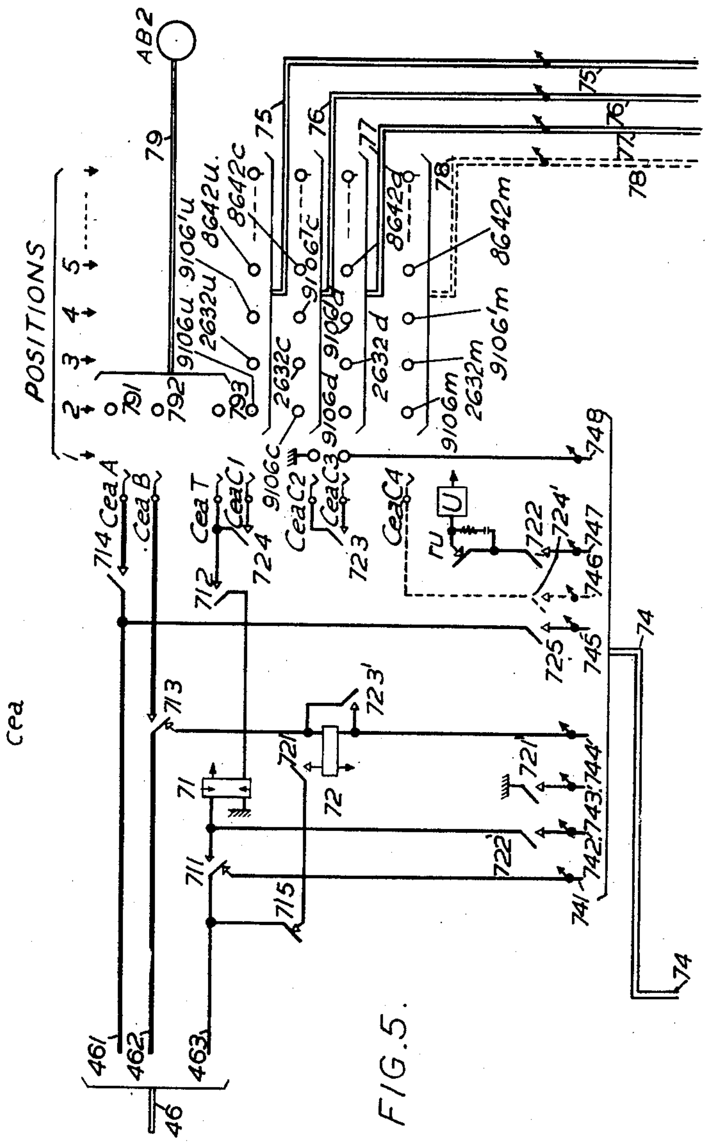
Figure 6:
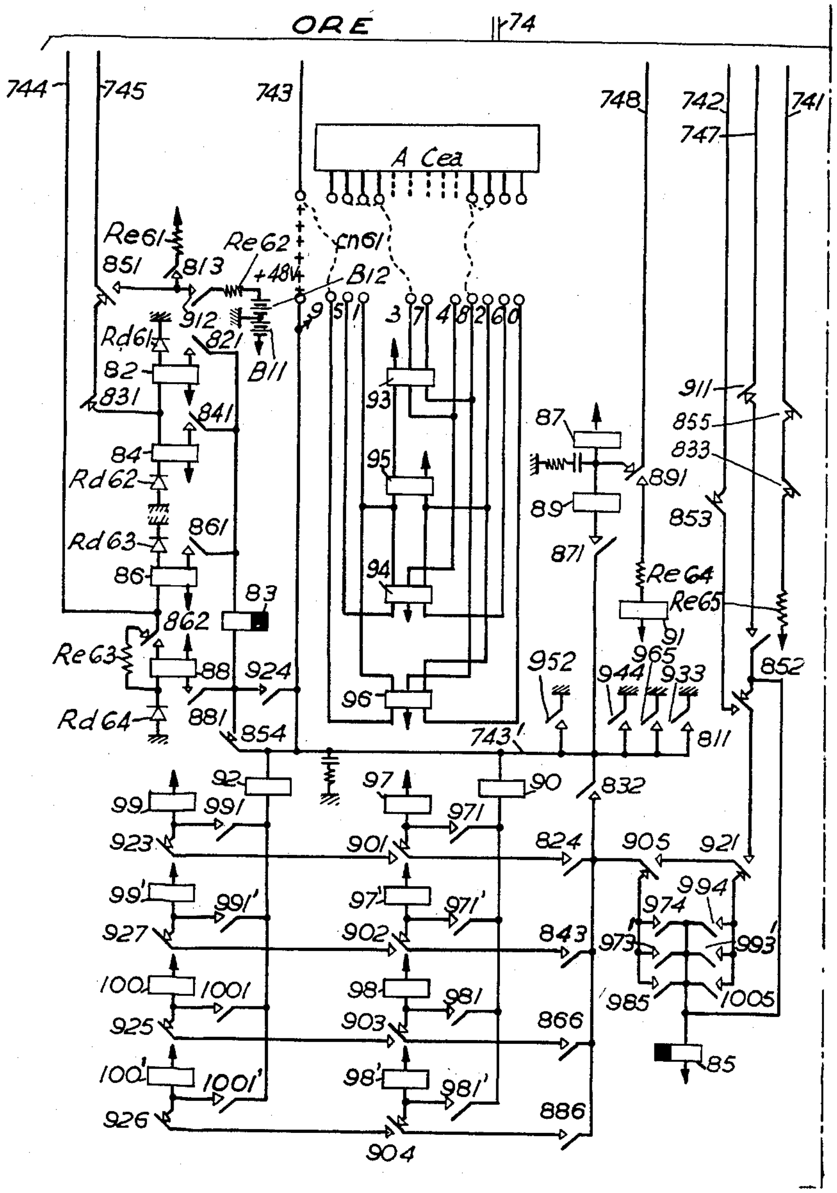
Figure 6A:
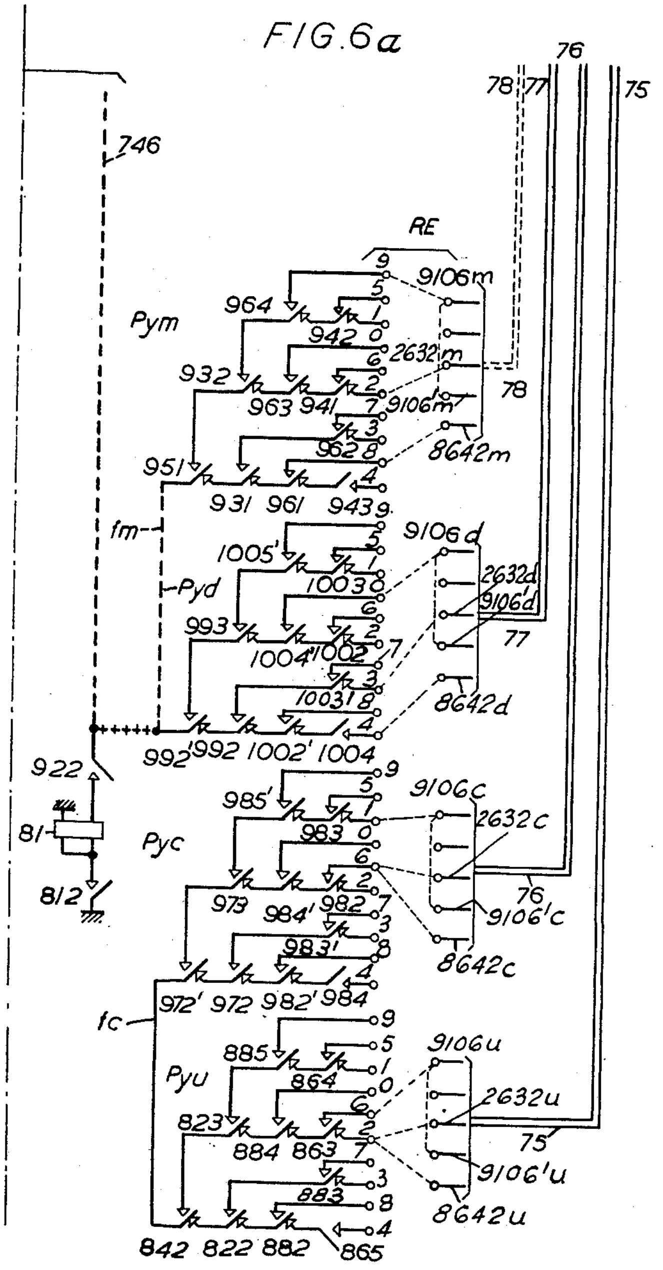
Figure 7:
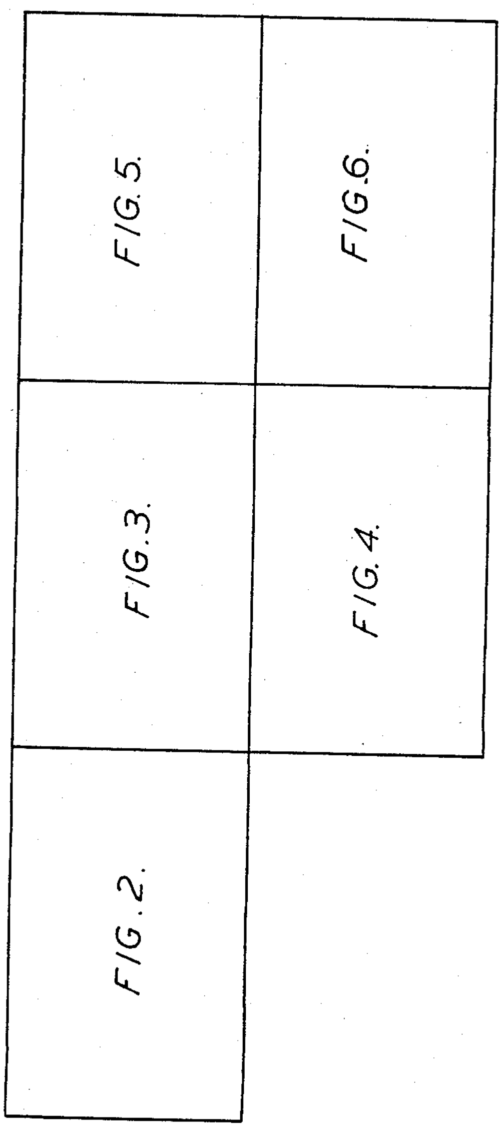

Various other features will appear from the description that follows, given as a non-limitative example, with reference to the appended figures, which represent;

Fig. 1, a junction diagram showing the general operation of the system;

Fig. 2, such circuit elements of a register as are necessary for an understanding of the invention;

Fig. 3, the schematic of a connector;

Fig. 4, the schematic of a director provided to operate in conjunction with the connector of Fig. 3;

Fig. 5, the schematic of a cooperating connector;

Figs. 6 and 6*a*, the schematic of a director provided to operate in conjunction with the connector of Fig. 5, and Fig. 7, the method of associating Figs. 2 to 6.

The general operation of the system will now be described with reference to Fig. 1. At C*c*, C*c*′, C*c*″, C*c*‴ are shown a certain number of connectors or final selectors. The first two connectors, namely C*c* and C*c*′, are provided to serve the subscribers of thousands *m*; the last two conectors, C*c*″ and C*c*‴, give access to the subscribers of another thousands *m*′. The four connectors C*c*, C*c*′, C*c*″ and C*c*‴ respectively serve the hundreds *c*, *c*′, *c*″ and *c*‴. Connector C*c* is connected to a register E*n* through a certain number of selection stages schematically represented by a dotted line 1. Similarly, the connectors C*c*′, C*c*″ and C*c*‴ are connected to other registers not shown.

Connectors C*c* to C*c*‴ normally give access (1) to subscribers having only one line and (2) to subscribers having a plurality of lines grouped under the same call number. In all that follows the expression "P. B. X group" will be used to designate lines grouped under the same call number.

In positions 1 and 2 of connectors C*c* are shown the lines numbered *mc*81 and *mc*82, which are two isolated lines. The selection of these subscriber lines is effected in the usual manner. The same applies to isolated lines *mc*′22, *m*′*c*″19, *m*′*c*‴43, *m*′*c*‴46, connected to the banks of the other connectors, C*c*′, C*c*″ and C*c*‴.

In positions 3, 4 and 5 of C*c* are shown three P. B. X lines group under the same number, *mc*83. Likewise, in positions 4 and 5 of connector C*c*′ are shown two P. B. X lines grouped under *mc*′24; in positions 2, 3, 4 and 5 of connector C*c*″ are shown four P. B. X lines grouped under number *m*′*c*″12; and in positions 1 and 2 of connector C*c*‴ are shown two P. B. X lines grouped under number *m*′*c*‴41.

It may happen that a subscriber having only one line wants another having the same number; also, a subscriber already having a group of P. B. X lines may want one or more other lines having the same number as the first lines.

Where these new lines cannot be accommodated immediately after the existing line or lines, the banks of the various connectors are provided, as required, with a certain number of positions giving access to cooperating connectors, such as *Cea* and *Cea'*. Thus, positions 6, 8 and 9 of connector *Cc* give access to lines 2, 3, and 4, each connected to a cooperating connector, *Cea*. There are as many cooperatng connectors *Cea* as there are lines 2, 3 and 4, but in order not to complicate the figure only one cooperating connector is shown.

The same cooperating connector *Cea* can be multiplied to the connectors of one or more hundreds, depending upon the traffic to be handled. Thus, in the example given, connector *Cc'* gives access, over lines 2, 3 and 4, to the same cooperating connectors as connector *Cc*. It will be noted that lines 2, 3 and 4 do not necessarily occupy the same positions on the banks of connectors *Cc* and *Cc'*. Thus, in the example given, lines 2, 3 and 4 are connected to positions 6, 8 and 9 of connector *Cc* and to positions 3, 7 and 10 of *Cc'*.

Likewise, *Cc''* gives access to lines 5 and 6, corresponding to cooperating connectors, such as *Cea'*. Connector *Cc'''* gives access to the same cooperating connectors as *Cc''*.

If it is desired to connect a cooperating connector, such as *Cea*, to a connector, such as *Cc*, and all the positions of said connector are busy, it is possible to replace a line of a P. B. X group connected to the banks of connector *Cc* with a link line to said cooperating connector. In this case, the disconnected P. B. X-group line is connected to any available position of said cooperating connector.

Where the new P. B. X lines requested by subscribers cannot be accommodated immediately after existing lines of the same group, said new lines are connected to the lines of cooperating connectors accessible to the connectors normally serving said subscribers.

Thus, the subscriber of P. B. X group number *mc*83, in addition to three lines connected to positions 3, 4 and 5 of connector *Cc*, has, grouped under the same call number, the lines connected to positions 4, 5, 7 and 9 of cooperating connector *Cea*. It is quite obvious that it is possible to provide a certain number of cooperating connectors, such as *Cea*, giving access to the same P. B. X lines depending upon traffic requirements.

Likewise, P. B. X group No. *mc'*24 has four lines whereof two are connected to positions 4 and 5 of connector *Cc'*, while the other two are connected to positions 1 and 10 of cooperating connector *Cea*.

A subscriber having only line number *mc*87, connected to the banks of *Cc*, has obtained a second line, having the same number but connected to position 2 of cooperating connector *Cea*. Likewise, the subscriber of line *mc'*26 has a group of two P. B. X lines, whereof the first is connected to the banks of the hundreds connector *c'* and the second to position 3 of *Cea*.

It will now be assumed that the calling subscriber desires a connection with a P. B. X-group No. *mc*83 subscriber. Register E*n*, connected to connector *Cc*, causes, by known means, the routing of said connector *Cc* to the first line of P. B. X group No. *mc*83, that is so say, to the line connected to position 3.

If that line is free, the connection is established as usual.

If that line is busy, *Cc* successively tests the second and third lines of the group, that is to say, the lines respectively connected to positions 4 and 5, until it finds a free line.

If upon reaching the last line of P. B. X group No. *mc*83 (position 5) connector *Cc* finds it busy, a special arrangement tells the connector that one or more other lines of the same P. B. X group are to be tested over the cooperating connectors, such as *Cea*, serving the thousands and the hundreds *mc*. The connector then continues stepping and hunts for a free line, such as 2, 3 or 4, giving access to a cooperating connector, such as *Cea*. Simultaneously, *Cc* causes an appropriate signal to be sent to register E*n* to tell the latter that it must control the routing of *Cea* by means of the last three digits *c*83. *Cea* hunts for a free one among the last four lines of P. B. X group No. *mc*83 connected to its banks, that is to say, one of the lines connected to positions 4, 5, 7 or 9.

It may be of interest to reach a specific one among a group of P. B. X lines; such is the case, for example, of a line of a group that would be connected to a special station at night.

In order to obtain this method of operation, that line is assigned an individual call number and it is connected (1) to the position of a connector corresponding to its individual call number and (2) to the position of a normal connector or of a cooperating connector corresponding to the call number of the P. B. X group.

Thus, for example, the line of P. B. X-group *mc*83 connected to position 5 of *Cea* is connected, on the other hand, to position 8 of connector *Cc'*. It can be reached (1) by means of the number of group No. *mc*83 and (2) by means of an individual call number, which will be assumed to be *mc'*28.

Of course, if individual call number *mc'*28 is dialed and the corresponding line is busy, there is no free hunting over the other lines of P. B. X group *mc*83 and the calling party receives the busy signal.

Likewise, the line connected to position 4 of connector *Cea'* and forming part of P. B. X group *m'c''*12 can be reached by means of individual call number *mc'*29.

The detailed operation of the system will now be described with refeernce to Figs. 2 to 6.

In the descriptions that follow, the relay contacts that are closed when the relay with which they are associated is energized, that is to say, pulled up, are indicated by prefixing the letter T to the spring number and the contacts that are closed when the relay is not energized, that is to say, when it is in its unoperated position, by prefixing the letter R to the spring number. Moreover, the contact springs associated with a given relay are indicated by adding to the relay reference one of the Figures 1 to 9.

The sequence-switch contacts are represented by two close circles at which terminate the circuits campleted by the sequence-switch wiper. The indications appearing opposite each contact refer to the sequence switch with which that contact is asssociated, to the wiper position or positions for which the sequence switch closes the contact involved, and to the sequence-switch wiper that closes said contact.

Each sequence switch is a rotary type switch, whose wipers are displaced by the action of a stepping magnet. To simplify matters, the same letter will be used to designate a stepping magnet and the sequence switch operated by the same magnet.

In order to simplify the drawings, the connecting wires, particularly those linking two neighboring figures, have been combined into cables. The various wires forming part of a given cable are generally designated by adding to the cable reference one of the Figures 1 to 9.

The battery normally used for supplying the various relays and the negative pole of which is designated by an arrow has its positive pole grounded; however, a special, low capacity battery has been provided, the negative pole of which is connected to the positive pole of the above-mentioned battery and which is used in particular to characterize lines terminating at the cooperating connectors. In the description the normal supply battery will be designated by the reference B*t*1 and the special battery by the reference B*t*2.

It will be assumed that the calling subscriber is connected to register E*n* (Fig. 2) over wires 40 and 40'. The number dialed by said subscriber is received at that register in accordance with a known method. Said register thereupon retransmits a certain number of digits, either translated or not, in order to cause the successive routing of the various selection stages.

In the example described it has been assumed that the register retransmitted each of the digits in the form of a coded signal. This signal consists in the presence of a pulsating current, a current of a given polarity, or of an alternating current on the two line wires 34 and 35.

When level digit $n$ must be transmitted, sequence switch S is at position $n$. The various relays shown are in normal position and contact *tg* is closed. On the other hand, when the corresponding selection stage is ready to receive this digit, it causes the application of a ground (not shown) to wire 35. The following circuit is then completed: wire 35 grounded, R231, R301, R291, relay 22, battery.

Relay 22 pulls up. At T221 it completes the following circuit: battery, right-hand winding of 24, T221, front *tg*, ground; over its contacts T222 to T225 and through the four wipers *a* to *d* of sequence switch S in position $n$ it connects the four relays 29, 30, 31 and 32 to the four wires 361, 371, 381 and 391, respectively. Said wires are connected to digit-registering device EC over cables 36 to 39. This device grounds all or part of these four wires, and that causes the operation of a combination of four relays 29 to 32, said combination characterizing the digit to be transmitted.

In the example described it will be assumed that the digit to be transmitted is a 2 and that relay 30 alone among the four relays 29 to 32 pulls up.

Relay 24 completes the following holding circuit for itself over T241: battery, right-hand winding of 24, R253, R331, T241, contact *tg* and ground; at T242 it prepares an energizing circuit for relay 23; at T243 it short-circuits its left-hand winding, and this makes it slow to release.

A coded signal, consisting in the application of a battery to upper line wire 34 and a negative pulsating current on lower wire 35, is then sent to the selection stage it is desired to route. The two circuits over which these signals are sent are as follows:

(1) Battery, resistance R*e*24, R311, R321, wire 34;

(2) Ground, generator G*e*21, one-way conducting element R*d*27, left-hand winding of relay 21 (which energizes), T301, R231, wire 35.

Rectifier R*d*23 (the same as rectifier R*d*24) has been provided to prevent any chattering of relay 21.

Relay 22 has had its energizing circuit opened at R301, but it is slow to release and holds immediately over contact T211 and contact *tg*.

The following table gives the relationship between (1) the digits to be transmitted and (2) the relays 29 to 32 that operate and the coded signal transmitted. The minus sign indicates that either a battery or a negative pulsating current is transmitted. The plus sign indicates that a positive pulsating current is transmitted; the sign Alt indicates that alternating current is transmitted.

| Digit sent | Relays energized | | | | Coded Signal | |
|---|---|---|---|---|---|---|
| | | | | | Wire 34 | Wire 35 |
| 1 | 29 | 30 | ------ | ------ | − | Alt |
| 2 | ------ | 30 | ------ | ------ | − | − |
| 3 | 29 | ------ | 31 | ------ | + | + |
| 4 | ------ | ------ | 31 | ------ | + | ------ |
| 5 | 29 | 30 | 31 | ------ | + | Alt |
| 6 | ------ | 30 | 31 | ------ | + | − |
| 7 | 29 | ------ | ------ | 32 | Alt | + |
| 8 | ------ | ------ | ------ | 32 | Alt | ------ |
| 9 | 29 | 30 | ------ | 32 | Alt | Alt |
| 0 | ------ | 30 | ------ | 32 | Alt | − |

It will be noted that when neither one of the two relays 29 and 30 is energized, such being the case for digits 4 and 8, the battery is applied to wire 35 over R231, R301, R291 and relay 22, but this battery does not constitute a coded signal, relay 22 having a high resistance and therefore preventing any energization of the signal-receiving relays located in the various selection stages.

The coded signal is sent out continuously and persists until the call number is registered in the selection stage involved. When this operation has ended, said stage makes a break in wire 35, this causing the release of relay 21.

Relay 21 opens at T211 the circuit of relay 22, which releases in turn.

Relay 22 completes the following circuit over back R221: battery, relay 23, T242, R221, contact *tg* and ground; over front T223 it opens the circuit of sending relay 30, which releases.

Relay 23 prepares over front T231 an energizing circuit for one of the two relays 25 or 33; at T232 it prepares a holding circuit for itself.

Relay 30 upon releasing stops the sending of the coded signal over wires 34 and 35; wire 34 is connected to the battery over contacts R321, R311 and resistance R*e*24, in order to prepare the seizure of the next selection stage; wire 35 is connected by T231 to the two relays 25 and 33 for a purpose explained hereinafter.

The selector that has just been seized sends the register, over wire 35, a signal indicating whether said selector should be directed by the same digit as the preceding selector or, on the contrary, whether it should be directed by the next digit. It will be assumed first that it must be directed by the next digit. In that case, the signal sent to the register over wire 35 consists in a negative polarity. Relay 33 then energizes over the following circuit: negative polarity applied to wire 35, T231, one-way conducting element R*d*22, upper winding of 33, ground.

Relay 33 opens the holding circuit of 24 over back R331, but said relay 24, being slow to release due to the short-circuiting of its left-hand winding, does not fall back at the instant involved; at T331 relay 33 completes the following circuit; battery, magnet S, T331, T241, contact *tg* and ground; at T333 it completes the following circuit for 23: battery, relay 23, T232, T333, contact *tg*, ground.

Relay 24 releases with a certain delay. At T241 is opens the circuit of magnet S, which falls back and causes the stepping of the associated sequence switch to the position corresponding to the transmission of the next digit; at T243 it switches out its left-hand winding, which prevents its being slow to pull up.

When the signal consisting in the application of a battery to wire 35 comes to an end, relay 33 falls back and opens, at T333, the holding circuit of 23, which releases in turn.

The various members of register E*n* then find themselves again in the same position they occupied before the transmission of the digit, with the sole difference that sequence switch S is in position $n+1$, which corresponds to the transmission of the next digit. Said sequence switch prepares over its wipers *a* to *d* the connection of the four sending relays 29–32 to wires 362, 372, 382 and 392, which correspond to the registering device of the next digit.

The various digits are transmitted in the same manner to the next selection stages.

It will be assumed that said stages have finally been directed to selector SE (Fig. 3). Said selector in turn receives a coded signal from register E*n* and proceeds to hunt, on the desired level for a free connector C*c* associated with an also free director OR (Fig. 4).

When C*c* and OR are available, all their relays are unoperated. An availability battery is then sent to test-wire *tse* of connector C*c* over the following circuit: wire *tse*, R421, wire 441' over cable 44 (Fig. 4), R665, R653, R634, R593, resistance R*e*41, battery. When test wiper TSE of SE finds this battery, a stopping relay (not shown) energizes and said selector stops on the connector C*c* involved.

When selector SE is connected to C*c* it causes the register to transmit the rigit that was used for its routing, in accordance with a method already described.

The following seizure circuit is then completed for connector C*c* and associated director OR: battery, resistance R*e*24, R311, R321, wire 34 (Fig. 3), wiper ASE of selector SE in the position corresponding to connector C*c* and bank contact, R424, left-hand winding of 43, wire 445 over cable 44 (Fig. 4), R562, resistance R*e* 42, one-way conducting element R*d*42, ground.

Relay 43 (Fig. 3) pulls up and at T431 it completes the following holding circuit for itself: battery, right-hand winding of 43, T431, R427, wire *tse*, bank contact and wiper TSE of selector SE and ground (not shown) on said selector; over front T437′, T434, T437, T435, T436, T432′, T433′, T435′, T436′, T431′ and T434′ it establishes the continuity of the connecting wires between connector C*c* and director OR; over contact T433 is short-circuits its left-hand winding in order subsequently to allow the passage of the coded selection-signals; at T438 it applies a ground to wire 443, which thereafter will be used for maintaining seized the various relays of director OR. In addition, the various following circuits are completed:

(1) Wire 443 grounded (Fig. 4), R632, relay 65, resistance R*e*43, battery;

(2) Wire 443 grounded, relay 60, resistance R*e*43′, battery;

(3) Wire 443 grounded, resistance R*e*44, resistance R*e*45, battery.

Relays 60 and 65 pull up. Moreover, owing to the flowing of current through resistances R*e*44 and R*e*45, the junction point *pt*1 between said resistances is brought to a negative potential comprised between that of the ground and that of the battery. In all that follows it will be assumed, by way of example, that the voltage of the supply battery is 48; since said battery has its positive pole connected to ground, taken as reference potential, the negative pole of said battery is at —48 volts. Further, if it is assumed that resistances R*e*45 and R*e*44 are equal, the junction point *pt*1 is brought to a potential of —24 volts.

Relay 43 (Fig. 3) completes the following circuit over T437: ground, one-way conducting element R*d*43 (Fig. 4), left-hand winding of 54, R591, wire 445′ over cable 44 (Fig. 3), T437, bank contact and wiper BSE of selector SE, wire 35 (Fig. 2), R231, R301, R291, relay 22, battery.

Relay 54 remains unoperated owing to the high resistance of relay 22, only this latter pulling up. Register E*n* then transmits the tens digit, in accordance with a method already described. It will be assumed in the example given that this digit is an 8. The corresponding coded signal then consists in the emission of an alternating current over upper line wire 34, as develops from the previously-given table of relationships. The circuit over which the coded signal is transmitted is as follows: ground, generator G*e*21 (Fig. 2), resistance R*e*22, T321, wire 34 (Fig. 3), wiper ASE of selector SE and bank contact, R424, T433, wire 445 over cable 44, left-hand winding of 56, one-way conducting element R*d*41, ground.

Relay 56 pulls up. At T561 it completes the following holding circuit for itself: battery, right-hand winding of 56, T561, relay 59, R532 and wire 443 grounded; at front T562 it completes the following circuit: alternating current on wire 445 coming from the register, T562, left-hand winding of relay 58, one-way conducting element R*d*42.

Relay 58 completes the following holding circuit for itself over T581: battery, left-hand winding of 58, T581, R532 and wire 443 grounded; over front T585 it prepares the circuit for stopping connector C*c* on the first line of the tens dialed.

The energization of relays 56 and 58 characterizes the reception of digit 8. In general, each digit is characterized by the energization of a combination of relays 52, 54, 56 and 58. The following table gives the relationship between the digits received, the corresponding coded signals and the relays energized.

| Digit Rec'd | Coded Signal | | Relays Energized | | | |
|---|---|---|---|---|---|---|
| | Wire 445 | Wire 445′ | | | | |
| 1 | − | Alt | 52 | 54 | ------ | ------ |
| 2 | − | − | ------ | 54 | ------ | ------ |
| 3 | + | + | 52 | ------ | 56 | ------ |
| 4 | + | | ------ | ------ | 56 | ------ |
| 5 | + | Alt | 52 | 54 | 56 | ------ |
| 6 | + | − | ------ | 54 | 56 | ------ |
| 7 | Alt | + | 52 | ------ | 56 | 58 |
| 8 | Alt | | ------ | ------ | 56 | 58 |
| 9 | Alt | Alt | 52 | 54 | 56 | 58 |
| 0 | Alt | − | ------ | 54 | 56 | 58 |

Moreover, connector C*c* (Fig. 3) comprises two series of wipers. The first series, namely, C*c*A1, C*c*B1, C*c*T1 and C*c*D1, corresponds to even tens; the second series, namely, C*c*A2, C*c*B2, C*c*T2 and C*c*D2, corresponds to odd tens.

Relay 59, slow acting, operates in series with the receiving relays after a certain time delay. At R591 it makes a break in signal receiving wire 445′, and this puts an end to the transmission by the register of the tens digit, as has already been indicated; at T594 it completes the following stepping circuit for connector C*c*; wire 443 grounded, R511, R531, T594, wire 449 over cable 44 (Fig. 3), T431′, back contact *rr* associated with stepping magnet R, battery; at T592 (Fig. 4) it prepares a stopping circuit for said connector.

Connector C*c* starts stepping. Said connector comprises a certain number of positions, only five of which are shown in order not to complicate the drawing. Position 1 gives access to the first line of a P. B. X group comprising two or more consecutive lines grouped under the same number; it is characterized by the presence of a —48 volt potential placed through resistance R*e*31 on the bank contact associated with discrimination wiper C*c*D1; position 2 gives access to a line that can be either an isolated line or a line of a P. B. X group other than the first or the last lines; it is characterized by the absence of any polarity on the bank contact associated with discrimination wiper C*c*D1. Position 3 gives access to the last line of a P. B. X group comprising no other line on the banks of the cooperating connector; it is characterized by the presence of a —24 volt potential on the bank contact associated with discriminating wiper C*c*D1; this —24 volt potential is obtained, for example, by means of a potentiometer made up of the two resistances R*e*32 and R*e*33. Position 4 gives access to the last line of a P. B. X group comprising other lines on the banks of the cooperating connector; it can also correspond to a subscriber having only one line on the banks of connector C*c* but having one or more other lines on the banks of the cooperating connector; is is characterized by the presence of a ground potential on the bank contact associated with discrimination wiper C*c*D1. Position 5 gives access to a cooperating connector; it is characterized by the presence of a +48 volt potential on the bank contact associated with C*c*D1. This +48 volt potential can be obtained by connecting a booster battery B*t*2 in series with normal supply battery B*t*1, the junction point of these two batteries being grounded.

In order not to complicate the figure unnecessarily, only the position corresponding to the first line of a tens has been shown.

When connector C*c* reaches the first line of tens 8, the following circuit is completed: battery, relay 53 (Fig. 4), R623, resistance R*e*47, T592, R644, T585, R543, control wire 7/8 belonging to cable 45, cable 45 (Fig. 3), bank contact and wiper CcC in the position corresponding to the first line of tens 8, T434', ground.

Relay 53 pulls up. Relay 67' operates likewise in parallel over the preceding circuit through contacts R643 and R642. At R531 relay 53 opens the stepping circuit of connector Cc, which stops at the position involved; at R532 it opens the holding circuit of registering relays 56 and 58, which release, and that of relay 59, which releases only after a certain delay; at T533 it completes a holding circuit for itself over T533 and wire 443 grounded.

At T672' relay 67' prepares a holding circuit for itself as also an energizing circuit for relay 64; at the instant involved said relay 64 is unoperated, being short-circuited (1) by the ground that causes the energization of 67' and (2) by T672' and the ground on wire 443.

Registering relay 58 upon releasing removes at T585 the ground that caused the energization of 67' and the short-circuiting of 64; relay 64 energizes and 67' holds over the following circuit: battery, 67', R643, lower winding of 64, T672', wire 443 grounded.

Relay 64 completes the following holding circuit for itself over T641: battery, upper winding of 64, T641 and wire 443 grounded; at T642 it prepares an energizing circuit for 66; at R643 it opens the holding circuit of 67', which releases; at T644 it prepares the connection of stopping relay 53 to the pyramid of contacts corresponding to the units digit; at T645 it prepares a second holding circuit for the marking relays as also for relay 59.

Relay 67' upon releasing prepares an energizing circuit for 66 over R671'.

After the routing by the tens digit, the selection stage, consisting of connector Cc and director OR, sends no signal to En. Therefore, relay 33 (Fig. 2) cannot energize in series with wire 35 in accordance with the method indicated for the selection stages. It then pulls up over the following circuit: battery, lower winding of 33, T233, wiper *a* of sequence switch S in position *d* (which corresponds to the transmission of the tens digit), T241, contact *tg*, ground. The rest of the operation in register En is the same.

Relay 59 (Fig. 4) opens at T592 the circuit of 53, which releases; at R591 it causes the application of a ground to signal-receiving wire 445' over a circuit already described, and this causes the register to send out the units digit.

The reception at director OR of the units digit and the consecutive routing of the connector to the called subscriber's line are effected in accordance with the same method as for the tens.

When relay 53 operates to cause the stopping of the connector, 66 energizes in parallel with 63 over contacts T642, T602 and R671'. Relay 53 cannot cause at R532 the release of registering relays 52, 54, 56 and 58, nor that of relay 59, said contact R532 being now short-circuited by T645.

It will be assumed first that the called subscriber has only one line and that said line is free. Said subscriber, who will be denoted by reference AB1 (Fig. 3), will be assumed to be connected to position 2 of connector Cc. An availability battery is then applied to test-wire 473 and the following circuit is completed: wire 473 to the battery, bank contact and wiper CcT1 of connector Cc, R412, T432', wire 447 over cable 44 (Fig. 4), R631, R682, series windings of 51, which energizes, T532, T645, ground on wire 443.

Relay 66 completes the following holding circuit for itself over T662: battery, 66, R671', T602, T662, wire 443 grounded; at T663 it prepares the transmission to the register of the signal characterizing a free subscriber.

At T667 it completes the following holding circuit for 51: wire 443 grounded, T667, series windings of 51 and the circuit already described.

Relay 51 prepares at T511 the circuit of the wiper-connecting relay in the connector; at T512 it short-circuits its high-resistance lower winding, in order to lower the test potential and busy the called subscriber's line; at T514 it short-circuits the upper winding of 60, which releases.

Relay 60 prepares at R601 the circuit of the wiper-connecting relay in the connector; at R603 it sends the register a signal intended to indicate that a connection has been made with a free subscriber, this signal consisting in a —48 volt potential sent over the following circuit: battery, resistance Re49, R681', R603, T651, T663, wire 445' over cable 44 (Fig. 3), T437, bank contact and wiper BSE of selector SE, wire 35 (Fig. 2), T231, one-way conducting element Rd22, upper winding of 33, ground. Relay 33 pulls up. At R604 and R605 relay 60 causes the immediate sending of the ringing current to the called subscriber over the following circuit: ground, generator Ge41, R605, R686', T654, wire 446' over cable 44 (Fig. 3), T436, R414, wiper CcA1 of connector Cc in position 2 and bank contact, wire 471, called subscriber station AB1, wire 472, bank contact and wiper CcB1 of connector Cc, R413, T435, wire 446 over cable 44 (Fig. 4), T652, R685', R604, resistance Re48, battery.

It will be noticed that generator Ge41 is provided to send the ringing current without any interruption; the subscriber is therefore alerted as soon as his line has been tested free.

At T602 relay 60 opens the circuit of 66, which falls back with a certain delay.

In register En sequence switch S is in position *u*, which corresponds to the transmission of the units digit. Therefore, the —48 volt polarity which was received over lower line wire 35 and caused the energization of relay 33, no longer has the same meaning as in the case of the other selection stages. It does not indicate that the next digit should be transmitted but that a connection has just been established with a free subscriber. Relay 33 then completes the following circuit over T332: battery, 26, R251, T332, wiper *a* of sequence switch S in position *u*, corresponding to the units digit, contact *tg*, ground.

Relay 26 pulls up and holds over a circuit not shown. Relay 24 thereupon releases with a certain delay and sequence switch S steps to the next position in a manner already described.

Three supplementary positions *c'*, *d'*, and *u'* have been provided in sequence switch S. These three positions are provided to transmit the three digits that must cause the routing of the cooperating connector. In the case under consideration, said positions are not used and are passed over in autmoatic rotation over the following circuit: battery, magnet S and its stepping contact *rs*, wiper *a* of sequence switch S in the three positions *c'*, *d'* and *u'*, R281, contact *tg*, ground. It thereupon reaches the next position, which may be used, for example, to meter the call. The register thereupon releases and the continuity is established in accordance with a known method between line wires 40 and 40', up the line, and line wires 34 and 35, down the line.

In director OR (Fig. 4) relay 66 upon releasing completes the following circuit over R661: general ground on wire 443, T511, R601, R661, wire 442 over cable 44 (Fig. 3), T434, upper winding of 42 (which energizes), battery; at T663 it stops the sending of the battery polarity to the register.

Relay 42 completes the following holding circuit for itself over T421: battery, upper winding of 42, T421, wire *tse*, bank contact and wiper TSE in selector SE and ground (not shown) on said selector; at T422 it completes the following circuit: ground, T422, lower winding of 42, T423, R412, wiper CcT1 of connector Cc in position 2 and bank contact, wire 473 and battery in the called subscriber's equipment. The fluxes produced by the two windings of 42 are of opposite direction; however, the flux of the upper winding is sufficiently high compared to that of the lower winding to allow the holding of the relay. At T424 and T425 it establishes the continuity of the line wires toward the called subscriber as follows: wire 34, wiper ASE of selector SE and bank contact, T424, R413, wiper CcB1 of connector Cc and bank contact, wire 472, loop of called subscriber AB1, wire 471, bank contact and wiper CcA1 of connector Cc, R414, T425, bank contact and wiper BSE of selector SE, wire 35. At R427 relay 42 opens the holding circuit of 43, which falls back.

Relay 43 eliminates the continuity of the connecting wires between connector Cc and director OR over its various front contacts T437', T434, T432, T437, T435, T436, T432', T433', T435', T436', T431' and T434'; at T438 it removes from wire 443 the ground that was holding seized the various relays of director OR.

In director OR (Fig. 4) relays 51, 59, 64 and 65, as well as the various relays for receiving the selection signals, fall back due to the removal of the holding ground from wire 443; relay 53 releases owing to the opening of contact T434' in connector Cc and owing to the removal of the ground from wire 443. Director OR is fully released and ready to handle a new call.

The sending of the ringing current to the called subscriber takes place in accordance with a known method and the connection is established as usual when the called subscriber answers.

At the moment of the release selector SE removes the ground from wiper TSE, and this causes the opening of the upper winding of relay 42. The flux produced by said winding therefore passes from the value it had before to a zero value; at a certain instant the resultant flux in relay 42 passes through 0 and said relay releases. The opening of the three front contacts T421, T422 and T423 makes any re-energization of said relay impossible. The above arrangement has been provided to accelerate the falling back of relay 42.

It will now be assumed that the same subscriber AB1 (Fig. 3), having only one line, is busy. In that case, no battery is found on test wire 473 of said subscriber and relay 51 of director OR cannot pull up (Fig. 4). Contact R511 remains closed and relay 63 energizes after a certain time lag over the following circuit: battery, 63, R683', T666, T531, R511, wire 443 grounded. At R632 relay 63 opens the circuit of 65, which releases with a certain delay.

At R651 relay 65 causes the sending to the register of a signal consisting in +48 volt potential. Said signal tells the register that the called subscriber is busy and is transmitted to said register over the following circuit: +48 volt potential, resistance Re40, R651, T663, wire 445' over cable 44 (Fig. 3), T437, bank contact and wiper BSE of selector SE, wire 35 (Fig. 2), T231, one-way conducting element Rd21, relay 25, ground.

At T252 relay 25 completes the following circuit: battery, relay 27, T252, R332, wiper *a* of sequence switch S in position *u* corresponding to the transmission of the units digit, contact *tg*, ground; at R253 it opens the holding circuit of 24, which falls back with a certain delay; at T254 it completes the following holding circuit for relay 23: battery, 23, T232, T254, contact *tg*, ground.

Relay 27 energizes and in accordance with a known method causes the sending of the busy signal to the calling subscriber and (if need be) the release of all the seized members.

The case will now be discussed of a subscriber having a plurality of lines grouped under the same number. It will be assumed first that all these lines are connected to the bank of connector Cc, said lines corresponding to consecutive positions of said connector.

The first line of the group will be assumed to be connected to position 1 of connector Cc. As has been indicated, such a line is characterized by the presence of a —48 volt potential on the bank contact associated with discrimination wiper CcD1 of Cc (Fig. 3).

If the first line of the group is available, the various operations follow one another as in the case previously described.

If the first line of the group is busy, relay 51 cannot operate, contact R513 remains closed and the following circuit is completed: —48 volt potential (Fig. 3), resistance Re31, bank contact and wiper CcD1 of Cc in position 1, T435', wire 448 over cable 44 (Fig. 4), R684, R513, T664, R624, upper winding of 62, one-way conducting element Rd47 and point *pt*1 brought to the —24 volt potential as has already been indicated.

Relay 62 pulls up. At T621 it completes the following holding circuit for itself: battery, lower winding of 62, T621, R684' and wire 443 grounded; at R623 it opens the holding circuit of 53, which falls back; at T623 it prepares the circuit of relay 53 in the case where the last line of the group is busy.

When relay 53 homes, connector Cc starts operating again in order to test the various lines of the P. B. X group. As has been indicated, said lines, with the exception of the first and the last, are charterized by the absence of any polarity on the bank contact associated with discrimination wiper CcD1.

When the connector finds a free line, other than the last, relay 51 energizes over the following circuit: wire 443 grounded, T667, series windings of 51 and the circuit already described. Relay 51 opens at R511 the stepping circuit of connector Cc, which stops at the position involved. Director OR then causes the energization of wiper-connecting relay 42 and the sequence of operations is identical with that already described.

If connector Cc has tested unsuccessfully all the lines of the group other than the last line, it finally reaches said last line. As has been indicated, the last line of a group having no other line on the banks of the cooperating connector is characterized by the presence of a —24 volt potential on the bank contact associated with discrimination wiper CcD1. Such is the case of the line connected to position 3 of connector Cc.

When Cc reaches such a position, the following circuit is completed: —24 volt potential (Fig. 3), bank contact and wiper CcD1 of Cc, T435', wire 448 over cable 44, R684, D513, T664, T623, relay 53, battery. Relay 53 pulls up. At R531 it opens the stepping circuit of the connector, which stops at the position involved.

If the last line of a group is available, relay 51 energizes and director OR causes the energization of wiper-connecting relay 42 (Fig. 3) as has already been indicated.

If the last line of the group is busy, relay 51 cannot pull up. After a certain lag, relay 63 energizes over the following circuit: battery, 63, R683', T666, T531, R511 and wire 443 grounded. The director then causes a +48 volt potential to be sent to the register in order to indicate the busy condition in accordance with a method already described.

The case will now be discussed of a subscriber having a plurality of lines grouped under the same number, and it will be assumed that some of said lines are connected to the banks of Cc, the other lines being connected to the banks of the cooperating connector.

When some lines of the group appear on the banks of connector Cc, while others appear on the banks of the cooperating connector, the last line connected to the banks of Cc is characterized by a ground potential on the bank contact associated with discriminating wiper CcD1. Such is the case, for example, of the line connected to position 4 of Cc.

Connector Cc starts by testing various lines to which it has direct access in accordance with the same method previously described. It reaches the last line of the group if it has not found any other line free. If said last line is free, director OR causes the energization of wiper relay 42 in the connector in accordance with a method already described.

If said line is busy, contact R513 remains closed and the following circuit is completed: ground potential (Fig.

3), bank contact and wiper CcD1 of connector Cc, T435', wire 448 over cable 44 (Fig. 4), R684, R513, T664, lower winding of 68, one-way conducting elements R*d*48, point *pt*1 brought to the —24 volt potential.

Relay 68 pulls up. At T681 it completes the following holding circuit for itself: battery, upper winding of 68, T681 and wire 443 grounded; at T682' it completes the following re-starting circuit for connector Cc: wire 443 grounded, R551, R571, T682', wire 449 and the circuit already described; at R682 it prevents any subsequent operation of relay 51; at T682, T683, T684 and T685 it prepares the circuit of one of the two stopping relays 55 or 57; at T681' it prepares the sending to the register of the signal consisting in alternating current, said signal being intended to indicate that the connection has been made to a cooperating connector; at R683' it prevents any subsequent re-energization of relay 63; at R685' and R686' it prevents any sending out of ringing current; at T684' it opens the holding circuit of 62, which falls back.

Connector C*c* (Fig. 3) then starts operating again in order to test the various lines having access to the cooperating connectors. As has been indicated, such lines are characterized by the presence of a +48 volt potential on the bank contact associated with discrimination wiper C*c*D1. Such is the case, for example, of the line connected to position 5 of C*c*.

An available line having access to a cooperating connector is characterized by the presence of a battery on test wire 463. This battery is applied over the following circuit: wire 463 over cable 46 (Fig. 5), R711, wire 741 over cable 74 (Fig. 6), R885, R833, resistance R*e*65, battery. When C*c* reaches such a line, the following two circuits are completed:

(1) Potential of +48 volts, bank contact and wiper C*c*D1 of C*c* in position 5, T435', wire 448 over cable 44 (Fig. 4), T684, lower winding of 55, one-way conducting element R*d*44, ground;

(2) Availability battery on wire 463 (Fig. 3), bank contact and wiper C*c*T1 of C*c*, R412, T432', wire 447 over cable 44 (Fig. 4), R631, T682, the two upper windings of 55 in series, resistance R*e*41', T684, wire 448 and the circuit previously described. One-way conducting element R*d*44 prevents the current coming from the availability battery from re-closing directly to the ground.

Relay 55 is of the so-called concurrent-flux type; it operates only when its various windings are carrying current and when these various currents are of suitable direction. In the case under consideration, relay 55 pulls up. At R551 it opens the stepping circuit of connector C*c*, which stops at the position involved; at T551 it prepares the energization of the wiper-connecting relay in the connector; at T552 it places the lower winding of relay 60 in parallel with its own left-hand upper winding.

The fluxes produced by the two windings of 60 are opposite. If the line selected is tested only by the connector and the director involved, the flux produced by the lower winding of 60 is equal to the flux produced by the other winding and said relay 60 falls back. At R603 it causes the sending to the register of a signal consisting in alternating current to indicate to said register that the connection has been made to a line terminating at a cooperating connector. This signal is transmitted over the following circuit: ground, generator G*e*42, resistance R*e*42', T681', R663, T651, T663, wire 445' over cable 44 (Fig. 3), T437, bank contact and wiper BSE of selector SE, wire 35 (Fig. 2), T231, one-way conducting element R*d*22, upper winding of 33, ground (for the negative half-wave) and one-way conducting element R*d*21, relay 25, ground (for the positive half-wave).

In addition, in accordance with a method already described, relay 60 causes the release of relay 66 and, consequently, the energization of wiper-connecting relay 42 in the connector, this latter thereupon causing the release of director OR.

In register E*n*, relay 25 in combination with 33 completes the following circuit: battery, relay 28, T251, T332, wiper *a* of sequence switch S in position *u*, contact *tg*, ground; at R253 it opens the holding circuit of 24, which falls back with a certain delay; at T254 it completes an already-described circuit for relay 23.

At T331 relay 33 causes the sequence switch to step to the next position in the manner already indicated; at T333 it completes a second holding circuit for 23.

Through the opening of its contact R281, relay 28 prevents the passing in automatic rotation of the three positions *c*', *d*', *u*', corresponding to the transmission of the three digits that must cause the routing of the cooperating connector; at T281 it completes the following holding circuit for itself: battery, relay 28, T281, contact *tg*, ground.

When the signal consisting in alternating current is no longer received over lower line wire 35 owing to the opening of contact T663 (Fig. 4) in director OR, relays 25 and 33 release (Fig. 2). Relay 23 releases, having its two holding circuits opened at T254 and T333. Register E*n* then finds itself in the position corresponding to the transmission of the hundreds digit to the cooperating connector. In the example described it has been assumed that the cooperating connectors and the associated directors capable of being reached through connector C*c* serve several hundreds of different subscribers but only the same thousand. The last three digits must therefore be repeated to said cooperating connector.

The seizure circuit of the cooperating connector and of the associated director is as follows: battery, resistance R*e*24 (Fig. 2), R311, R321, upper line wire 34 (Fig. 3), selector SE, wiper ASE and bank contact, T424, R413, wiper C*c*B1 of connector C*c* in position 5 and bank contact, wire 462 over cable 46 (Fig. 5), R713, right-hand winding of 72, wire 744 over cable 74 (Fig. 6), R862, resistance R*e*63, one-way conducting element R*d*64, ground.

Relay 72 pulls up. At T721 it completes the following holding circuit for itself: battery, left-hand winding of 72, T721, R715, wire 463 over cable 46 (Fig. 3), bank contact and wiper C*c*T1 of C*c*, R412, T423, lower winding of 42, T422, ground. Relay 42 remains energized for the same reason as before. Relay 72 (Fig. 5) establishes the continuity of the various connecting wires between cooperating connectors C*ea* and the corresponding director ORE over its various front contacts T722', T725, T722 and T724. At T723' it short-circuits its right-hand winding in order to allow the selection signals to pass to director ORE; at T721' it causes the application of a ground to wire 743, in order to prepare the holding of the various members of ORE.

In the example described, that is to say, in the example where director ORE receives only three digits, the cross connections in Figs. 5 and 6 are made and those indicated by dotted lines are eliminated.

The selection stage consisting of the connector and the cooperating director is now ready to receive the hundreds digit. A signal consisting in a ground is then sent to the register in order to cause the register to send out said hundreds digit. This signal is sent over the following circuit: ground, one-way conducting element R*d*62, left-hand winding of 84 (which is not energized in this circuit), R831, R851, wire 745 over cable 74 (Fig. 5), T725, wire 461 over cable 46 (Fig. 3), bank contact and wiper C*c*A1 of connector C*c*, R414, T425, bank contact and wiper BSE of selector SE, wire 35 (Fig. 2), R231, R301, R291, high-resistance relay 22, battery.

Relay 22 energizes and in accordance with a method already described causes the hundreds digit to be sent to the cooperating selection stage. This signal is transmitted over lower line wire 35, through the previously-described circuit for relay 22; over upper line wire 34, the transmission circuit is as follows: upper line wire 34 (Fig. 3), wiper ASE of selector SE and bank contact, T424, R413, wiper C*c*B1 of C*c* in position 5 and bank contact, wire 462 over cable 46 (Fig. 5), R713, T723', wire 744 over cable 74 (Fig. 6) and receiving relays 86 and 88.

The reception of the hundreds digit at relays 82, 84, 86 and 88 is effected in accordance with the same method as for relays 52, 54, 56 and 58 of director OR. It will be assumed, by way of example, that the hundreds digit received is a 1, corresponding to the reception of a negative polarity over wire 744 and of an alternating current over wire 745. The relays that operate then are 82 and 84.

Relay 82 completes the following holding circuit for itself at T821: battery, right-hand winding of 82, T821, relay 83, R854 and wire 743 grounded. Relay 83, being slow to operate, energizes only with a certain delay. Relay 84 completes a similar holding circuit for itself.

When relay 83 has operated, it makes, at R831, a break in signal-receiving wire 745 in order to put an end to the transmission of the hundreds digit by the register; at T832 it completes the following circuit; battery, relay 97, R901, T824, T832 and wire 743 grounded. Relay 97' energizes in accordance with a similar method.

At T971 relay 97 prepares a holding circuit for itself, as also an energizing circuit for relay 90; said relay 90 cannot energize at the moment involved, being short-circuited (1) by the ground of wire 743 and (2) by the ground causing the energization of 97. At T974 relay 97 completes the following circuit; battery, relay 85, T974, R905, R832 and wire 743 grounded. Also, at T971' relay 97 prepares a holding circuit for itself, as also an energizing circuit for 90; at T973' it completes a second circuit for 85. Relay 85, being slow to operate, does not energize at the moment involved.

As develops from the foregoing explanations, the hundreds digit, first received by the four relays 82, 84, 86 and 88, is thereupon registered by the four relays 97, 97', 98 and 98'. Receiving relays 82, 84, 86 and 88 will thereupon be re-used to register the tens digit, then the units digit.

The following table gives the relationship between each of the digits received and the relays that receive and register said digits.

| Hundreds Digit | Receiving Relays | | | | Registering Relays | | | |
|---|---|---|---|---|---|---|---|---|
| 1 | 82 | 84 | ------ | ------ | 97 | 97' | ------ | ------ |
| 2 | ------ | 84 | ------ | ------ | ------ | 97' | ------ | ------ |
| 3 | 82 | ------ | 86 | ------ | 97 | ------ | 98 | ------ |
| 4 | ------ | ------ | 86 | ------ | ------ | ------ | 98 | ------ |
| 5 | 82 | 84 | 86 | ------ | 97 | 97' | 98 | ------ |
| 6 | ------ | 84 | 86 | ------ | ------ | 97' | 98 | ------ |
| 7 | 82 | ------ | 86 | 88 | 97 | ------ | 98 | 98' |
| 8 | ------ | ------ | 86 | 88 | ------ | ------ | 98 | 98' |
| 9 | 82 | 84 | 86 | 88 | 97 | 97' | 98 | 98' |
| 0 | ------ | 84 | 86 | 88 | ------ | 97' | 98 | 98' |

When relay 85 operates, after a certain time lag, it opens, at R854, the holding circuit of receiving relays 82 and 84, as also that of 83.

At T824 and T843 relays 82 and 84 remove the ground that caused the energization of 97 and 97' and the short-circuiting of 90; said relays 97 and 97' hold and 90 energizes over the following two circuits:

(1) Battery, relay 97, T971, relay 90 and ground of wire 743;

(2) Battery, relay 97', T971', relay 90 and ground of wire 743.

Relay 90, through its contacts RT901 to RT904, isolates the registering circuit of relays 97, 97', 98 and 98', to connect it to relays 99, 99', 100 and 100', which are provided to register the tens digit; at R905 it opens the circuit of relay 85, which, being slow to release, falls back only after a certain time lag; at T905 it prepares a new energizing circuit for 85 after registering the tens digit.

When relays 83 and 85 have homed, a ground is applied to signal-receiving wire 745 over a circuit already described, and this causes the register to send out the tens digit.

The reception of the tens digit is effected over the four relays 82, 84, 86 and 88 in accordance with the same method previously described; however, owing to the position of contacts RT901 to RT904, the registering of this digit is not effected by relays 97, 97', 98 and 98' but by relays 99, 99', 100 and 100'. Relay 92 operates in accordance with the same method as 90. A table of relationships similar to the one already given could be established for the tens digit by replacing relays 97, 97', 98 and 98' with relays 99, 99', 100 and 100', respectively.

It will be assumed, by way of example, that the tens digit registered is a 0; the marking relays then energized are 99', 100 and 100'.

It will be noticed that director ORE transmits no +48 or −48 volt signal after the reception of the hundreds digit and of the tens digit; the circuit of relay 33 (Fig. 2) is then as follows: battery, lower winding of 33, T233, wiper *d* of sequence switch S in positions *c'* and *d'*, T241, contact *tg*, ground.

The reception of the units digit is effected over the four relays 82, 84, 86 and 88 always in accordance with the same method until the energization of relay 83 exclusively, but this digit remains registered in said relays 82, 84, 86 and 88 instead of being transferred to other relays. In fact, said relays remain energized through front contact T924.

It will be assumed, by way of example, that the units digit registered is a 6; the relays then energized are 84 and 86.

When relay 83 operates, after a certain time lag, it completes the following circuit at T832: ground on wire 743, T832, T905, T921, R811, relay 85, battery.

Relay 85 operates with a certain delay. At T852 it completes the following stepping circuit for the cooperating connector: ground on wire 734, T832, T905, T921, R811, T852, R911, wire 747 over cable 74 (Fig. 5), T722, back contact *ru* associated with stepping magnet U, magnet U, battery. Through its contact *ru* said magnet U causes the stepping in automatic rotation of the various wipers of cooperating connector *Cea*.

Connector *Cea* comprises a certain number of positions, of which only 5 are shown in order not to complicate the drawing. Position 1 is a reference position, whose function will be explained subsequently. Positions 2 and 4 give access respectively to two lines of a P. B. X group corresponding to call number 9106. Position 3 gives access to a line corresponding to call number 2632 and position 5 to a line corresponding to call number 8642.

In director ORE (Fig. 6) four contact pyramids have been provided, associated with the various registering relays. Pyramid P*ym* corresponds to the thousands digit and is not used in the case under consideration. Pyramid P*yc* consists of a certain number of contacts associated with hundreds-digit registering relays 97, 97', 98 and 98'; it comprises one input wire *fc* and 10 output wires 0 to 9, said wire *fc* being connected, through the contacts of relays 97, 97', 98 and 98', to the particular one of the ten wires 0 to 9 corresponding to the hundreds digit dialed. In the example described, the hundreds digit is a 1 and the registering relays energized are 97 and 97'. Wire *fc* is always connected to wire 1 over the chain of contacts T972', T973, R985' and R983.

Pyramid P*yd* corresponds to the tens digit and consists of a certain number of contacts associated with registering relays 99, 99', 100 and 100'.

Pyramid P*yu* corresponds to the units digit and consists of a certain number of contacts associated with relays 82, 84, 86 and 88.

The various explanations given for pyramid P*yc* also apply to the other two pyramids, P*yd* and P*yu*.

Each of pyramids P*yc*, P*yd* and P*yu* comprises 10 output wires, which makes a total of 30 wires. These wires are connected to a distributor RE. This distributor also comprises three connection terminals per line. The three connection terminals 9106*c*, 9106*d* and 9106*u* correspond to the first of the lines grouped under call number 9106; connection terminals 9106′*c*, 9106′*d* and 9106′*u* correspond to the second of the lines grouped under call number 9106. Likewise, the three connection terminals, 2632*c*, 2632*d* and 2632*u* correspond to line No. 2632; the three connection terminals 8642*c*, 8642*d* and 8642*u* correspond to line No. 8642.

Generally, distributor RE comprises (1) $10\times m$ connection terminals, if $m$ represents the number of digits received, and (2) $m\times n$ additional connection terminals, if $n$ represents the number of lines connected to the banks of cooperating connector C*ea*.

Connection terminals 9106*c* and 9106′*c* are connected together and further connected to output wire No. 1 of pyramid P*yc*. Terminal 2632*c* is connected to output wire No. 6 of pyramid *Pyc*; terminal 8642*c* is also connected to output wire 6 of pyramid P*yc*. Generally, each of the connection terminals located to the right of distributor RE and opposite pyramid P*yc* is connected to the output wire of said pyramid corresponding to the hundreds digit of the line.

Connection terminals 9106*u*, 9106′*u*, 2632*u* and 8642*u* are similarly connected to the output wires of pyramid P*yd*, each of said terminals being connected to the output wire of the pyramid corresponding to the tens digit of the line.

Connection terminals 9106*u*, 9106′*u*, 2632*u* and 8642*u* are similarly connected to the output wires of pyramid P*yu*, each of said terminals being connected to the output wire of the pyramid corresponding to the units digit of the line.

The wires corresponding to connection terminals 9106*c*, 9106′*c*, 2632*c* and 8642*c* are grouped in a cable 76 and terminate at bank contacts associated with wiper C*ea*C2 of the cooperating connector (Fig. 5). Terminal 9106*c* is connected to the bank contact corresponding to wiper C*ea*C2 in the position assigned to the first line 9106; the other terminals, 9106′*c*, 2632*c* and 8642*c*, are similarly connected.

The wires corresponding to terminal 9106*d*, 9106′*d*, 2632*d* and 8642*d* are grouped in a cable 77 and terminate at bank contacts associated with wiper C*ea*C3 of the cooperating connector. The connection is effected in accordance with a method similar to the one previously mentioned.

The wires corresponding to terminals 9106*u*, 9106′*u* 2632*u* and 8642*u* are grouped in a cable 75 and terminate at bank contacts associated with wiper C*ea*C1 of the cooperating connector. The connection is effected always in accordance with the same method.

For the purpose of simplification, the same reference number is used to designate the connection terminals, such as 9106*c*, and the wires connected to them.

It will be assumed that the call number dialed is 9106 and that the first line of this group is available.

As has been indicated, that line was assumed to be connected to position 2 of cooperating connector C*ea*. Under these conditions, an availability battery is applied to test-wire 793 through subscriber equipment AB2.

When C*ea* reaches that line the following circuit is completed: ground, series windings of relay 81 (Fig. 6), T922, cross connection, T992′, R993, T1004′, wire 0 of pyramid P*yd*, connection terminal and wire 9106*d*, cable 77 (Fig. 5), wire 9106*d*, of (sic—Translator) bank contact and wiper C*ea*C3 of connector C*ea* in position 2, T723, wiper C*ea*C2 of connector C*ea* in position 2 and bank contact and wire 9106*c*, cable 76 (Fig. 6), wire 9106*c*, wire No. 1 of pyramid P*yc*, R983, R985′, T973, T972′, wire *fc*, T842, R823, R884, T863, wire No. 6 of pyramid P*yu*, connection terminal and wire 9106*u*, cable 75 (Fig. 5), wire 9106*u*, bank contact and wiper C*ea*C1 of connector C*ea* in position 2, T724, wiper C*ea*T of said connector and bank contact, wire 793, cable 79 and availability battery in called subscriber equipment AB2.

Relay 81 pulls up. At R811 it opens the stepping circuit of the cooperating connector, which stops at the position involved, and that of relay 85, which releases with a certain delay; at T811 it prepares the circuit of the wiper-connecting relay 71 in said connector; at T812 it short-circuits its high resistance left-hand winding in order to lower the test potential and thus busy the line selected; at T813 it causes a signal to be sent to the register indicating that a free subscriber has been selected. This signal consists in a battery and is sent over the following circuit: battery, resistance R*e*61, T813, T851, wire 745, the circuit already described for transmitting the selection signals up to register EN (Fig. 2), wire 35, T231, one-way element R*d*22, upper winding of 33, ground.

When relay 85 falls back, it puts an end, at T851, to the transmission of the battery to the register; at R853 it completes the following circuit: ground of wire 743, T832, T905, T921, T811, R853, wire 742 over cable 74 (Fig. 5), T722′, upper winding of relay 71, battery.

Relay 71 pulls up. At T711 it completes the following holding circuit for itself: battery, upper winding of 71, T711, wire 463 and ground on the connector over a circuit already described. At T712 it completes the following circuit: ground, lower winding of 71, T712, wiper C*ea*T of connector C*ea* in position 2 and bank contact, wire 793 and battery on subscriber equipment AB2. Relay 71 holds for reasons similar to those already explained in connection with the operation of connector C*c*. At T713 and T714 relay 71 established the continuity of the line wires through C*ea*; at R715 it opens the holding circuit of 72, which releases.

Relay 72 eliminates the continuity of the connecting wires between connector C*ea* and the corresponding director ORE owing to the opening of its front contacts T722′, T721′, T725, T722, T723 and T724. At T721′ it removes the ground from wire 743 that was holding director ORE seized, thereby causing the release of said director in the following manner. Relays 84, 86, 83, 90, 92, 97, 97′, 99′, 100 and 100′ release owing to the removal of the ground from wire 743. Relay 81 releases, having its circuit opened by the connector at T723 and T724 (Fig. 5). Director ORE is fully released and ready to handle a new call.

In register EN (Fig. 2) the reception of battery signal over lower line wire 35 has caused the operation of relays 33 and 26 in accordance with a method already described. It will be noticed that the energizing circuit of 26 passes through wiper *a* of sequence switch S in position *u′*, corresponding to the transmission of the units digit to the cooperating connector.

Sequence switch S thereupon steps to the next position, which, as has been indicated, may correspond to metering operations, and then releases. The ringing current is sent to the subscriber in accordance with a known method, and, when the latter answers, the connection is established between the called and the calling subscribers. The speaking circuit is as follows: wire 40, wire 34 and the circuit already described up to wiper C*c*A1 of connector C*c* (Fig. 3), bank contact and wire 461, cable 46 (Fig. 5), T714, wiper C*ea*A of connector C*ea* in position 2 and bank contact, wire 791, cable 79, subscriber equipment AB2, cable 79, wire 792, bank contact and wiper C*ea*B of connector C*ea*, T713, wire 462 over cable 46 (Fig. 3), bank contact and wiper C*c*B1 of connector C*c* and the circuit already described.

At the moment of the release, selector SE (Fig. 3) and connector C*c* release in accordance with a method already described. Owing to the opening of contacts T422 and T423, the ground is removed from wiper C*c*T1, and that causes the opening of the circuit of the upper winding of 71. This latter falls back for reasons similar to those already explained in connection with the operation of C*c*.

The chain of members used for establishing the connection is fully released.

If the first line of the group corresponding to call number 9106 is busy, no availability battery is found on test wire 793 of said line (Fig. 5). Relay 81 (Fig. 6) cannot operate when the cooperating connector passes over the corresponding position. The stepping of said connector continues, said connector testing the second line of the group in accordance with the same method.

If said line is busy and so are all the other lines of the group, connector *Cea* tests the group a second time. This is done in the following manner.

When *Cea* passes over position 1, or reference position, the following circuit is completed: ground, bank contact and wiper *Cea*C2 of *Cea*, T723, wiper *Cea*C3 and bank contact, wire 748 over cable 74 (Fig. 6), R891, 87, battery.

Relay 87 pulls up. At T871 it prepares a holding circuit for itself, as also an energizing circuit for 89. At the instant involved, said relay 89 is short-circuited (1) by the ground causing the energization of 87 and (2) by T871 and the ground of wire 743.

When connector *Cea* passes over the reference position a second time, that is to say, when it has tested all the lines of the group at least once, the following circuit is completed: ground, bank contact and wiper *Cea*C2 of *Cea* in position 1, T723, wiper *Cea*C3 and bank contact, wire 748 over cable 74 (Fig. 6), T891, resistance R*e*64, relay 91, battery.

Relay 91 pulls up. At R911 it opens the stepping circuit of the connector, which stops; at T912 it sends the connector a signal to tell it that the line is busy. This signal consists in a +48 volt potential and is sent over the following circuit: resistance R*e*62, T912, T851, wire 745 and the circuit already described. As has been indicated, the register causes the sending of the busy signal to the calling subscriber and (if need be) the release of all the members seized.

The operation is the same when the called subscriber has only one line on the banks of connector *Cea.*

In the case where all the lines terminating at the cooperating connectors are busy, the stepping of connector *Cc* continues and said lines are tested again. After a certain period of time, a time device comprised in the register causes, in accordance with a known method, the sending of the busy signal to the calling subscriber and (if need be) the release of all the members seized.

It has been assumed in the preceding description that the cooperating selection stage was routed by only the last three digits of the called subscriber's call number. However, it may happen that director ORE is assigned to a plurality of connectors serving different thousands. It is then necessary that said director be able to register the thousands digit in order to cause the proper routing of the cooperating connector.

In order to obtain that method of operation, the cross connections are eliminated in Figs. 5 and 6 and replaced with those indicated by dotted lines.

It will be assumed, by way of example, that cooperating connector *Cea* is designed to serve subscribers of thousands 9. In that case, wire 743 (individual to the connector involved) will be connected to wire 9 through connection *cn*61.

The following circuit is completed the moment director ORE is seized: ground of wire 743, connection *cn*61, wire 9, left-hand winding of 96, left-hand winding of 95 and 93, battery. Relays 96, 95 and 93 pull up, their energization indicating that the called subscriber belongs to thousands 9. Over its contacts T965, T952 and T933 it causes the grounding of wire 743′ in order to allow the operation of the various relays of the director; over their contacts T951, T932 and T964 they connect input wire *fm* of pyramid P*ym* to output wire 9 of said pyramid. The connections involving said pyramid are made in accordance with the same method as for the other three pyramids, P*yc*, P*yd* and P*yu*. It suffices to notice that connection terminals 9106*m*, 2632*m*, 9106′*m* and 8642*m* are connected through cable 78 to the bank contacts associated with wiper *Cea*C4 (Fig. 5) of connector *Cea.*

Generally, wire 743 should be connected through connection *cn*61 to the particular one of the 10 wires 0 to 9 that corresponds to the thousands served by the connector involved. At the moment of seizure of the director, this causes the operation of a combination of relays characterizing the thousands of the called subscriber.

In the example given it has been assumed that director ORE controlled one connector of thousands 9, three connectors of thousands 3 and two connectors of thousands 8.

The following table gives the relationship between the thousands digit and the called subscriber and the registering relays energized.

| Thousands Digit | Relays Energized | | | |
|---|---|---|---|---|
| 1 | 93 | | 95 | |
| 2 | | | 95 | |
| 3 | 93 | 94 | | |
| 4 | | 94 | | |
| 5 | 93 | 94 | 95 | |
| 6 | | 94 | 95 | |
| 7 | 93 | | | 96 |
| 8 | | | | 96 |
| 9 | 93 | | 95 | 96 |
| 0 | | | 95 | 96 |

The rest of the operation is identical with that already described, the energizing circuit of stopping relay 81 alone being different. In the case of a subscriber corresponding to call number 9106, this circuit is as follows: ground, series windings of 81, T922, dotted-line connection, wire 746 over cable 74 (Fig. 5), T724′, wiper *Cea*C4 of connector *Cea* in position 2 and bank contact, wire 9106*m*, cable 78 (Fig. 6), wire 9106*m*, wire 9 of pyramid P*ym*, contacts of said pyramid in the positions corresponding to digit 9, wire *fm*, contacts of pyramid P*yd* in the positions corresponding to tens digit 0 of said pyramid, wire 9106*d*, cable 77 (Fig. 5), wire 9106*d*, bank contact and wiper *Cea*C3 of connector *Cea* in position 2, T723, wiper *Cea*C2 of connector *Cea* and bank contact, wire 9106*c*, cable 76 (Fig. 6), wire 9106*c*, output wire 1 of pyramid P*yc*, contacts of said pyramid in the positions corresponding to hundreds digit 1, wire *fc*, contacts of pyramid P*yu* in the positions corresponding to units digit 6, output wire 6 of said pyramid, wire 9106*u*, cable 75 (Fig. 5), wire 9106*u*, bank contact and wiper *Cea*C1 of connector *Cea*, T724, wiper *Cea*T of said connector in position 2 and bank contact, wire 793, cable 79 and availability battery (not shown) in called subscriber equipment AB2.

It may happen that a subscriber has a plurality of lines grouped under the same call number, the first of said lines being connected to the banks of connector *Cc* and the other lines being connected to those of cooperating connector *Cea.* Such is the case, for example, of a subscriber that at first had only one line and that has applied for one or more additional lines having the same number. The one line connected to the banks of connector *Cc* is then characterized by a ground on the bank contact associated with discrimination wiper *Cc*D1. The operation is then the same as for the last line of a group having one or more additional lines on the banks of the cooperating connector.

Connector *Cc* (Fig. 3) has two series of wipers. The series of wipers assigned to index 1 gives access to the subscriber lines of even tens; the series of wipers assigned to index 2 gives access to the subscriber lines of odd tens. The first case has been discussed in the preceding description and the second will now be considered.

As follows from one of the previously-given relationship tables, relay 52 is operated every time an odd digit is dialed and unoperated when an even digit is dialed. If the tens dialed is an odd tens, contact T525 is closed and the following circuit is completed: battery, relay 67, T525, R646, R684', wire 443 grounded.

Relay 67 pulls up. At T674 it completes a holding circuit for itself; at T672 it prepares the energization of relay 41 (Fig. 3), which, in the connector, must cause the switching in of the second series of wipers; at T673 it prepares the test circuit; at T671 it prepares the discrimination circuit of the called line.

The rest of the operation is similar to that already described, except for the following differences. The circuit of test relay 51 passes through T673, wire 447' over cable 44 (Fig. 3), T433', wiper C*c*T2 of connector C*c*. The circuit for discriminating the nature of the called line runs through: wiper C*c*D2 of connector C*c*, T436', wire 448' over cable 44 (Fig. 4), T671 and R684.

When a free subscriber line has been found and wiper-connecting relay 42 pulls up (Fig. 3), relay 41 energizes in parallel with said relay 42 over the following circuit: battery, relay 41, T437', wire 441 over cable 44, T672 and the circuit already described for relay 42. At T411 relay 41 completes the following holding circuit for itself: battery, 41, T411, wire *tse*, bank contact and wiper TSE of selector SE and ground (not shown) on said selector; over its contact RT412 to RT414 it isolates the first series of wipers, C*c*T1, C*c*B1, C*c*A1, and switches in the second series of wipers, C*c*T2, C*c*B2. C*c*A2.

It will be noticed that if the tens digit is an even digit, but the units digit is an odd digit, relay 52 operates promptly upon the reception of said units digit but 67 cannot energize, owing to the opening of contact R646.

The case will now be discussed where connector C*c* finds a free line terminating at the cooperating connector and connected to the second series of wipers. In that case, it is relay 57 that operates, instead of 55. The two operating circuits of 57 are similar to those already described for 55. At T573 relay 57 causes the energization of the wiper-switching relay over the following circuit: wire 443 grounded, R553, T573, wire 441 over cable 44 (Fig. 3), T437' relay 41, battery. Relay 41 energizes, holds and controls the switching in of the second series of wipers.

If connector C*c* simultaneously finds a free line in each of the two series of wipers, both relays 55 and 57 operate. However, owing to the opening of back contact R552, double-test relay 60 tests only the line corresponding to the first series of wipers. On the other hand, contact R553 is opened and the wiper-switching relay does not operate in the connector. The connection is effected to the line corresponding to the first series of wipers.

It may happen that the tens digit dialed is an odd digit, this leading, as has been indicated, to the operation of relay 67. If the called subscriber's line or lines are all busy, and if said subscriber has other lines connected to the banks of the cooperating connector, connector C*c* must proceed to hunt for a free line terminating at a cooperating connector. Since this line may correspond to the second series of wipers just as well as to the first, it is necessary to cause the release of relay 67, the energization of which indicates that the second series of wipers should be switched in.

When connector C*c* must proceed to hunt for a free line to a cooperating connector, relay 68 pulls up, as has been indicated, this causing the opening of the holding circuit of 67. Contacts RT671 and RT673 return to normal position; due to this, relays 55 and 57 are both ready, the first to test a free line corresponding to the first series of wipers and the second a free line corresponding to the second series of wipers. Connector C*c* can then proceed to hunt for a free cooperating line over the first just as well as over the second series of wipers.

The case will now be discussed where the call originates with a toll operator. A ground (not shown) is then applied to wiper SSE of selector SE (Fig. 3) and the following circuit is completed upon seizure: ground on wiper SSE and bank contact, T432, wire 444 over cable 44, upper winding of 61, battery. Relay 61 pulls up.

Relay 65 cannot energize, being short-circuited (1) by the ground of wire 443 and R632 and (2) by the ground of wire 444 and T611.

The rest of the operations is similar to those already described, with the following differences.

If the called subscriber is free, the ringing current is not sent by director OR, due to the opening of the two contacts T652 and T654.

If the called subscriber is busy but no other operator is waiting on the call, the operator must be able to listen in and wait on the call in progress. This method of operation is obtained in the following manner. When the subscribed is busy, relay 63 pulls up, as indicated for the general case, and the following circuit is completed: ground, lower winding of 61, T631, wire 447 over cable 44 (Fig. 3), R412, wiper C*c*T1 of connector C*c* and bank contact, wire 473, cable 47 and battery through called subscriber equipment AB1; but, because the line is busy, test wire 473 is also grounded by the member engaged with said subscriber. Part of the current flowing in the previously-described circuit is thus shunted to said member. Under these conditions, the current flowing through the lower winding of 61 is such that the flux produced by said lower winding is exactly opposite to that of the upper winding. Relay 61 eliminates, at T611, the short-circuiting of relay 65, said relay then energizing over the following circuit: battery, resistance R*e*43, relay 65, T632 and ground on wire 444. At R611 relay 61 causes the energization of 67' over T643, R611 and the ground of wire 444.

Relay 65 prepares, at T651, the sending to the register of the battery signal indicating that the connection is going to be made to a busy subscriber having no call waiting.

Relay 67' opens, at R671', the circuit of relay 66, which falls back with a certain delay; at T673' it prepare the energizing circuit of the wiper relay in the connector; at T674' it causes the above-mentioned battery signal to be sent to the register. This signal is sent over the following circuit: battery, resistance R*e*49, R681', T674', T651, T663 (which is held closed during the slow-release period of relay 66), wire 445' and the circuit already described. It will be noticed that this signal is the same as in the case where the subscriber was free; the result in the register is therefore identical, said register completing the connection and then releasing.

When 66 falls back, after a certain time lag, it controls the energization of the wiper-connecting relay over the following circuit: ground, T633, T673', R661, wire 442 over cable 44 (Fig. 3), T434, upper winding of 42, battery. The connection is then made to the subscriber and director OR releases, as has already been indicated. The operator can then listen in and wait on the call in progress, in accordance with a known method.

The case will now be discussed where the subscriber, called by an operator, is busy, another operator being on watch on the call in progress. The circuit of the lower winding of 61 is completed as in the preceding case, but this time the test wire 473 of the called subscriber (Fig. 3) is grounded through the two members already engaged with said called subscriber. Part of the current flowing through the lower winding of 61 is therefore shunted to each of said members; due to this, the flux produced by said lower winding can no longer balance the flux of the upper winding and said relay 61 holds in operating position. Relay 65 remains short-circuited, relay 67' cannot energize and a +48 volt potential is sent to the rigster through contact R651; the register causes the busy signal to be sent to the calling operator and (if need be) releases the chain of seized members.

In register E*n* (Fig. 2) devices have been provided that allow repeating to the next selection stage the digit already used for controlling the routing of the preceding selection stage (redoubling). When this happens, the selector that has just been routed sends the register, over wire 35, not a −48 volt potential but a +48 volt potential, thereby causing the energization of relay 25 over a circuit already described.

Relay 25 opens, at R253, the circuit of 24, which falls back only with a certain delay due to the fact that it is made slow to release by the short-circuiting of its left-hand winding; at T254 it completes a holding circuit already described for relay 23. Magnet S cannot operate, due to the opening of contact T331, and the sequence switch then remains in the position corresponding to the sending of the digit that has just been used to route the preceding selector.

When the +48 volt potential sent by the selector that has just been routed is eliminated, relay 25 releases and opens, at T254, the holding circuit of relay 23, which releases in turn. The register is then in a position to send the same digit to the next selector.

It is quite evident that the preceding descriptions have been given only as a non-limitative example and that a certain number of variations can be made. The device described relates to a continuous marking system, but a certain number of features could be applied to other systems, such as revertive-pulse systems, electronic-switching systems, etc.

It would also be possible to provide a plurality of consecutive cooperating-connector stages and to characterize the various lines by means of currents of different frequencies or phases, without departing from the scope of the invention.

I claim:

1. An automatic telephone system comprising a plurality of lines, certain of said lines being arranged in groups with a single number assigned each group, a register adapted to be seized by a calling line, a final selector adapted to be seized by said register, a supplementary final selector, said final selector having access to a portion of the lines of a group and to said supplementary final selector, said supplementary final selector having access to the remainder of the lines of said group, means controlled by said register when the number of said group is called for causing said final selector to test the lines of said group successively and if all of said lines are busy to connect to said supplementary final selector, means also controlled by said register responsive to the connection of said final selector with said supplementary final selector for causing said supplementary final selector to test successively the remainder of the lines of said group and to connect to the first free line thereof, said final selector and said supplementary final selector being each provided with a control circuit, and means in each control circuit for marking the terminals of its associated selector in accordance with signals received from the register for controlling the selection operation of said selector.

2. An automatic telephone system, as defined in claim 1, in which the marking means in each control circuit comprises registering means for registering digits received from the register and means for marking the terminals of its associated selector under control of said registering means.

3. An automatic telephone system comprising a plurality of lines, certain of said lines being arranged in groups with a single number assigned each group, a register adapted to be seized by a calling line, a final selector adapted to be seized by said register, a supplementary final selector, said final selector having access to a portion of the lines of a group and to said supplementary final selector, said supplementary final selector having access to the remainder of the lines of said group, means controlled by said register when the number of said group is called for causing said final selector to test the lines of said group successively and if all of said lines are busy to connect to said supplementary final selector, and means also controlled by said register responsive to the connection of said final selector with said supplementary final selector for causing said supplementary final selector to test successively the remainder of the lines of said group and to connect to the first free line thereof, said last mentioned means including means to signal the register when it is necessary for the final selector to connect to the supplementary final selector and means responsive to said signalling means for causing said register to repeat the transmission of the same digits as were transmitted to control the final selector so as to control the final supplementary circuits.

4. An automatic telephone system comprising a plurality of lines, certain of said lines being arranged in groups with a single number assigned each group, a register adapted to be seized by a calling line, means in said register for registering the digits of a called number which are transmitted to said register from a calling line which has seized said register, a final selector adapted to be seized by said register, a supplementary final selector, both of said final selectors having terminal banks containing sets of terminals and sets of wipers cooperating with said terminals, the terminal bank of said final selector having sets of terminals connected to certain of said lines and one set of terminals connected to the wipers of said supplementary final selector, a certain number of the lines of a group being connected to the sets of terminals of said final selector bank and the remaining lines of said group being connected to the sets of terminals in the terminal bank of said supplementary final selector, a control circuit for said final selector, means in said final selector responsive to a signal from said register for connecting said final selector with said control circuit, means in said control circuit for transmitting a signal to said register when said control circuit has been connected to said final selector, means in said register responsive to said signal for transmitting signals representing a digit to said control circuit, means in said control circuit responsive to said digit-representing signals for causing said final selector to hunt over its terminals for a free line in the group identified by said signals, means for transmitting a signal to said control circuit if the last of the lines of the wanted group terminating in said final selector is busy, means responsive to said last-mentioned signal for causing said final selector to hunt for and find the set of terminals leading to said supplementary final selector, means for seizing said supplementary final selector when said final selector has been connected thereto, means for transmitting a signal to said register when said supplementary final selector has been seized, means responsive to said last-mentioned signal for transmitting control signals to said supplementary final selector, and means responsive to said control signals for causing said supplementary final selector to hunt for a free line in the wanted group terminating in said supplementary final selector.

References Cited in the file of this patent

UNITED STATES PATENTS

| | | |
|---|---|---|
| 1,542,977 | Williams et al. | June 23, 1925 |
| 1,799,175 | Merk | Apr. 7, 1931 |
| 2,070,909 | Lubberger | Feb. 16, 1937 |
| 2,172,947 | Taylor et al. | Sept. 12, 1939 |
| 2,190,140 | Taylor et al. | Feb. 13, 1940 |
| 2,267,987 | Mahoney et al. | Dec. 30, 1941 |